United States Patent
Berggren et al.

(10) Patent No.: US 12,010,622 B2
(45) Date of Patent: Jun. 11, 2024

(54) ACTIVATION OF WAKE-UP SIGNALING OPERATION

(71) Applicant: Sony Group Corporation, Tokyo (JP)

(72) Inventors: Anders Berggren, Lund (SE); Torgny Palenius, Barsebäck (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/794,976

(22) PCT Filed: Feb. 12, 2021

(86) PCT No.: PCT/EP2021/053445
§ 371 (c)(1),
(2) Date: Jul. 24, 2022

(87) PCT Pub. No.: WO2021/160794
PCT Pub. Date: Aug. 19, 2021

(65) Prior Publication Data
US 2023/0092687 A1     Mar. 23, 2023

(30) Foreign Application Priority Data

Feb. 13, 2020   (SE) .................................. 2030048-9

(51) Int. Cl.
*H04W 52/02* (2009.01)
*H04W 68/02* (2009.01)
(Continued)

(52) U.S. Cl.
CPC ..... *H04W 52/0229* (2013.01); *H04W 68/025* (2013.01); *H04W 68/04* (2013.01); *H04W 76/27* (2018.02); *H04W 76/28* (2018.02)

(58) Field of Classification Search
CPC ................ H04W 76/20–28; H04W 84/02–027
See application file for complete search history.

(56) References Cited

U.S. PATENT DOCUMENTS

2013/0128788 A1*   5/2013   Guey .................... H04W 76/28
                                                               370/311
2014/0112225 A1    4/2014   Jafarian
(Continued)

FOREIGN PATENT DOCUMENTS

WO    2019033112 A1    2/2019
WO    2019063336 A1    4/2019
(Continued)

OTHER PUBLICATIONS

International Search Report and Written Opinion from corresponding International Application No. PCT/EP2021/053445, dated May 17, 2021; 12 pages.
(Continued)

*Primary Examiner* — San Htun
(74) *Attorney, Agent, or Firm* — Tucker Ellis LLP

(57) ABSTRACT

A method of operating a wireless communication device (101) connectable to a cellular network (100) includes obtaining information (791) indicating whether a wake-up signaling operation is activated for the wireless communication device (101) in individual cells (701-720) of the cellular network (100). The method also includes determining, based on the obtained information (791) and a current cell of the cellular network (100), whether the wake-up signaling operation is activated for the wireless communication device (101) in the current cell. The method further includes, upon determining that the wake-up signaling operation is activated in the current cell: monitoring for a wake-up signal (980) prior to a paging occasion (396) in accordance with the wake-up signaling operation.

20 Claims, 10 Drawing Sheets

(51) Int. Cl.
*H04W 68/04* (2009.01)
*H04W 76/27* (2018.01)
*H04W 76/28* (2018.01)

(56) References Cited

U.S. PATENT DOCUMENTS

| | | | | |
|---|---|---|---|---|
| 2016/0128020 | A1* | 5/2016 | Agarwal | H04W 68/04 370/328 |
| 2019/0045481 | A1* | 2/2019 | Sang | H04B 1/713 |
| 2019/0150114 | A1* | 5/2019 | Liu | H04W 52/0229 370/252 |
| 2019/0312758 | A1* | 10/2019 | Liu | H04L 25/03866 |
| 2019/0342833 | A1* | 11/2019 | Åström | H04W 8/24 |
| 2020/0037247 | A1* | 1/2020 | Liao | H04W 72/0453 |
| 2021/0022202 | A1* | 1/2021 | Kim | H04W 76/27 |
| 2022/0124617 | A1* | 4/2022 | Takeda | H04W 52/0274 |

FOREIGN PATENT DOCUMENTS

| | | |
|---|---|---|
| WO | WO-2019064208 A1 | 4/2019 |
| WO | 2019147061 A1 | 8/2019 |
| WO | 2019160271 A1 | 8/2019 |

OTHER PUBLICATIONS

Office Action and Swedish Search Report from corresponding Swedish Application No. 2030048-9, dated Dec. 16, 2020; 11 pages.
Huawei et al., "Discussion on SA2 reply LS on WUS assistance information," 3GGP TSG-RAN WG2 Meeting #108, R2-1915319, Nov. 18-22, 2019, 3 pages.
Sony, "On supporting UE group wake up signal for MTC/NB-IoT," 3GPP TSG-RAN WG2 Meeting #107, R2-1913362, Oct. 14-18, 2019, 7 pages.
Ericsson, "9.13.9 Wake up Signal," 3GPP TSG-RAN2 Meeting #102, R2-1807773, May 21-25, 2018, 6 pages.
LG Electronics, "Discussion on wake up signal configurations and procedures in NB-IoT," 3GPP TSG RAN WG1 meeting #93, R1-1806589, May 21-25, 2018, 9 pages.
Qualcomm Incorporation, "Efficient monitoring of DL control channels," 3GPP TSG RAN WG1 Meeting #90, R1-1712800, Aug. 21-25, 2017, 10 pages.
3GPP, "[CB] Offline discussion #701 (Qualcomm) to conclude whether to include in the SA2 LS that the MME should also be aware of WUS in Rel-15, and how to address use of WUS with mobility. Draft the LS," 3GPP TSG RAN WG2 #108, R2-1916429, Nov. 18-22, 2019, 6 pages.
Sony, "On supporting UE group WUS operation with mobility," 3GPP TSG-RAN WG2 Meeting #109bis e, R2-2002671, Apr. 20-30, 2020, 6 pages.
Huawei, Hisilicon, "Discussion on WUS requirements for efeMTC", 3GPP TSG-RAN WG4 Meeting #88Bis, Chengdu, China, Oct. 8-12, 2018, R4-1813018, pp. 1-4.
Qualcomm, Report from Offline discussion #701, 3GPP TSG RAN WG2 #108, Reno, USA, Nov. 18-22, 2019, Tdoc R2-1916429, pp. 1-10.
Sony, "WUS aspects on grouping and mobility for efeMTC and feNB-IoT", 3GPP TSG RAN WG2 Meeting #100, Reno, USA, Dec. 1-27, 2017, R2-1712993, pp. 1-8.
Xiaomi Communications, "Discussion on how the WUS works with C-DRX", 3GPP TSG-RAN2 #106, Reno, USA, May 13-17, 2019, R2-1906484, pp. 1-6.

* cited by examiner

ACTIVATION OF WAKE-UP SIGNALING OPERATION

TECHNICAL FIELD

Various examples generally relate to paging operation in wake-up signaling operation. Various examples specifically relate to activating and deactivating the wake-up signaling operation for individual wireless communication devices and individual cells of a cellular network.

BACKGROUND

There is a need to reduce power consumption of wireless communication devices (UEs). One strategy to reduce power consumption of a UE is to operate the UE in a disconnected mode. As a general rule, the disconnected mode provides limited connectivity if compared to a connected mode, but enables a reduced power consumption. For example, in the context of the Third Generation Partnership Project (3GPP), example implementations of the disconnected mode include the Radio Resource Control (RRC) RRC_Idle mode and RRC_Inactive mode.

As a general rule, when operating in the disconnected mode, the UE can expect transmissions from the communications network (NW) to be restricted to ON periods of a discontinuous reception (DRX) cycle; accordingly, during OFF periods of the DRX cycle, the UE can transition some parts of its wireless interface into an inactive state. For example, an analog front end and/or more parts of a digital front end can be shut down. This helps to reduce the power consumption.

In particular, the disconnected mode can be associated with a paging operation. In accordance with the paging operation, the communications NW can transmit one or more paging signals during a paging occasion (PO) to the UE. In accordance with the paging operation, the UE monitors for the one or more paging signals at the PO. In response to receiving the one or more paging signals, the UE can attempt to transition into the connected mode, by setting up a data connection. POs are aligned with the ON periods of the DRX cycle.

It has been observed that attempting to receive (monitoring) for the one or more paging signals during the PO can require significant power at the UE. For example, activating an analog frontend, e.g., clock, may require significant power. For example, it may be required to perform blind decoding of a logical channel using frequency-domain processing at the UE. Then, after this energy-intensive task, it can turn out that the particular UE is not paged. Thus, there are attempts to reduce the energy consumption associated with monitoring for the one or more paging signals.

To mitigate such drawbacks, wake-up signal (WUS) operation has been introduced. A WUS is transmitted prior to the PO. Monitoring for the WUS generally tends to require less power at the UE if compared to monitoring for the paging signal. For example, this can be achieved by a less complex modulation of the WUS, if compared to the modulation of the paging signal. Alternatively or additionally, it would be possible to have a smaller bandwidth allocated to the UE, to enable a smaller receive bandpass which can help to reduce a current consumption. For instance, it is known to use sequence-based WUSs that do not require frequency-domain processing at the UE, thereby reducing the power consumption associated with monitoring for the WUS due to time-domain processing being sufficient.

At the same time, due to the limited complexity of the WUS, typically, the WUS is shared between multiple UEs. In other words, the WUS may not be UE-specific. Accordingly, if there is a single UE, within a group of UEs that share a given WUS, that is to be paged, then all UEs of the group of UEs will, subsequent to receiving the WUS, monitor for the one or more paging signals (even though only a single UE will actually be paged). This also causes significant power consumption across the ensemble of UEs of the group.

SUMMARY

Accordingly, there is a continued need for providing techniques that facilitate low UE power consumption when operating in a disconnected mode employing WUS operation.

This need is met by the features of the independent claims. The features of the dependent claims define embodiments.

A method of operating a UE is provided. The UE can connect to a cellular network. The method includes obtaining information that indicates whether a WUS operation is activated for the UE in individual cells of the cellular network. The method also includes determining, based on the obtained information and a current cell of the cellular network, whether the WUS operation is activated for the UE in the current cell. The method further includes monitoring for a WUS prior to paging occasion in accordance with the WUS operation, upon determining that the WUS operation is activated in the current cell.

A computer program or a computer-program product, or a computer-readable storage medium includes program code that can be executed by at least one processor. The least one processor can load the program code. Upon executing the program code, the at least one processor performs a method of operating a UE. The UE can connect to a cellular network. The method includes obtaining information that indicates whether a WUS operation is activated for the UE in individual cells of the cellular network. The method also includes determining, based on the obtained information and a current cell of the cellular network, whether the WUS operation is activated for the UE in the current cell. The method further includes monitoring for a WUS prior to paging occasion in accordance with the WUS operation, upon determining that the WUS operation is activated in the current cell.

A UE that is connectable to a cellular network is provided. The UE includes control circuitry. The control circuitry is configured to obtain information. The information indicates whether a WUS operation is activated for the UE in individual cells of the cellular network. The control circuitry is further configured to determine whether the WUs operation is activated for the UE in the current cell, based on the obtain information and the current cell of the cellular network. The control circuitry is further configured to monitor for a WUS prior to a paging occasion and in accordance with the WUS operation, upon determining that the WUS operation is activated in the current cell.

A method of operating a node of a cellular network is provided. The method includes determining, for each of one or more cells of the cellular network, whether to activate a WUS operation for the UE in the respective cell prior to paging a UE. The method also includes, upon determining that the WUS operation is to be activated in at least one sale of the one or more cells, triggering a transmission of a WUS prior to paging occasion and the at least one cell accordance with the WUS operation.

A computer program or a computer-program product or a computer-readable storage medium includes program code that can be executed by least one processor. Executing the program code causes the at least one processor to perform a method of operating a node of a cellular network. The method includes determining, for each of one or more cells of the cellular network, whether to activate a WUS operation for the UE in the respective cell prior to paging a UE. The method also includes, upon determining that the WUS operation is to be activated in at least one sale of the one or more cells, triggering a transmission of a WUS prior to paging occasion and the at least one cell accordance with the WUS operation.

A node of a cellular network is provided. The node includes control circuitry. The control circuitry is configured to determine, for each of one or more cells of the cellular network, whether to activate a WUS operation for a UE in the respective cell prior to paging the UE. The control circuitry is also configured to trigger a transmission of a WUS prior to paging occasion in at least one cell in accordance with the WUS operation, upon determining that the WUS operation is to be activated in the at least one cell.

The node be an access node or a base station of the cellular network. The node can be a core-network node of a core of the cellular network, e.g., a mobility-control node.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
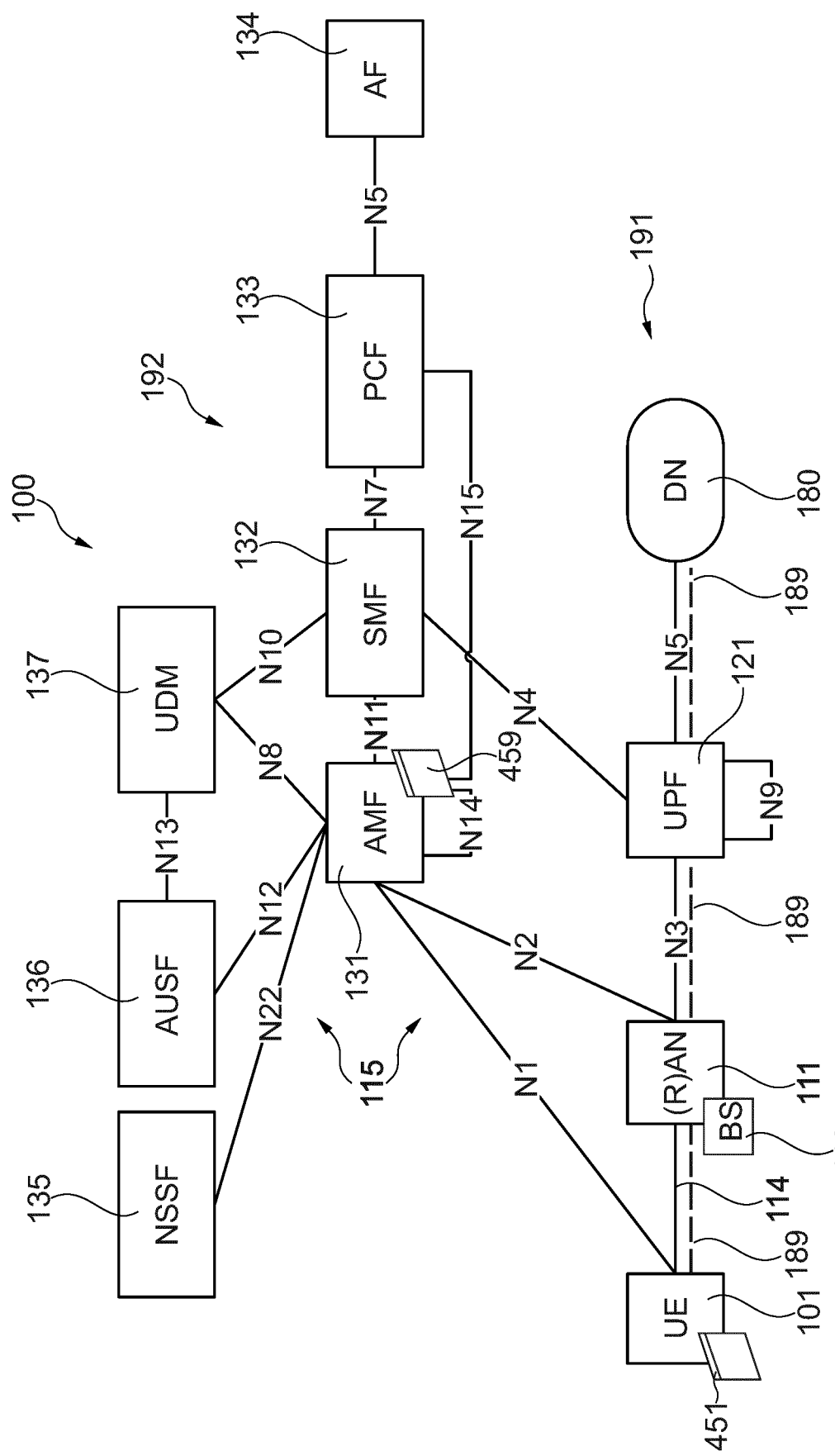
FIG. 1 schematically illustrates a cellular NW according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various aspects relate to a communication system. For example, the communication system may be implemented by a UE and an access node of a communications NW. For example, the access node may be implemented by a base station (BS) of a cellular communications NW (simply, cellular NW hereinafter). Hereinafter, for sake of simplicity various examples will be described in connection with an implementation of the communication system by a UE connectable to a cellular NW. However, similar techniques may be readily employed for other kinds and types of communication systems.

The communication system may include a wireless link between the UE and the BS. Downlink (DL) signals may be transmitted by the BS on the wireless link and received by the UE. Uplink (UL) signals may be transmitted by the UE and received by the BS. Hereinafter, techniques will be described that facilitate operation of a UE in a disconnected mode. The disconnected mode may restrict connectivity, e.g., in terms of when the UE can receive data and/or in terms of what signals the UE can receive. The disconnected mode can generally enable a UE to shut down partly or fully one or more components of its wireless interface. When a UE operates in the disconnected mode, it is possible that the cellular NW discards certain information associated with the UE, e.g., certain information of the UE context, etc. It would be possible that a UE-specific data connection on the wireless link between the cellular NW and the UE is released. As a general rule, the UE operating in the disconnected mode can use a DRX cycle, i.e., alternatingly switch the wireless interface between an active state and an inactive state. When in the inactive state, the wireless interface may be unfit to receive data. When switching from the inactive state to the active state, the UE may monitor for a reference signal (RS), to (re-)establish synchronization. The RS can be indicative of a cell identity of a current cell of the cellular NW at which the UE is located. This can be used by the UE to determine the current cell.

The disconnected mode can be generally associated with a paging operation: The ON period of the DRX cycle can be time-aligned with a PO of the paging operation. When the paging operation is activated, the cellular NW can attempt to contact/page the UE at the PO, e.g., by transmitting one or more paging signals at the PO; and the UE can monitor for the one or more paging signals at the PO. Thereby, a transition from the disconnected mode to a connected mode can be triggered. The transition from the disconnected mode to the connected mode can involve a random-access (RA) procedure.

The RA procedure can use a RA preamble that is indicative of a temporary identity of the UE. The RA preamble can be transmitted on shared resources and, thus, can be subject to contention between multiple UEs. In some scenarios, data can be transmitted during the RA procedure. This is sometimes referred to as early-data transfer (EDT). The data can be piggybacked to a message of the RA procedure. DL data and/or UL data may be communicated. For example, this could include a measurement report of the UE, e.g., including neighbor cell measurements. Another option would be a paging-area update request message to be transmitted using EDT and a paging-area update message to be received using EDT. Yet another example would be a position update report.

There are various options available for implementing the paging operation at the cellular NW. As a general rule, paging operation can be handled by a core-NW mobility management node. This would be typically the case for an implementation of the disconnected mode as idle mode, e.g., 3GPP RRC_Idle. Here, the paging operation is centrally controlled by the core-NW mobility management node. But there are also scenarios in which the paging operation is handled by the radio-access NW (RAN), e.g., in connection with an implementation of the disconnected mode by inactive mode such as RRC_Inactive in a 3GPP implementation.

The paging operation can include definition of one or more paging areas. Paging areas help to attribute for UE mobility while the UE operates in the disconnected mode: UE mobility may occur while the UE operates in the disconnected mode; i.e., the UE may move between cells of the cellular NW. The UE mobility may not be directly known to the cellular NW, because the UE does not always provide updates on its position. For instance, the UE may operate using the DRX cycle and, thus, may not detect the UE mobility while operating the wireless interface in the inactive state. To account for such UE mobility, it is possible to use a paging area. The paging area includes one or more cells of the cellular NW and the UE can be paged across the paging area, so as to increase the probability of successfully reaching the UE even though UE mobility may occur. The UE can monitor whether it leaves the paging area and, in the affirmative, may transmit a paging-area update request message to the cellular NW; the cellular NW can then configure a new paging area and transmit a respective paging area update message to the UE. Different implementations of a paging area are known, e.g., a so-called tracking area (TA) defined by the core NW of the cellular NW, or a variant thereof, namely the tracking area list (TAL). Another option for the implementation of the paging areas the RAN notification area (RNA) that is handled by the radio NW, i.e., without contacting the core NW of the cellular NW. RNA is used in 3GPP RRC_Inactive; and TA or TAL are used in 3GPP RRC_Idle.

The paging operation at the cellular NW can include a paging escalation sequence. The paging escalation sequence defines a strategy for extending the radius of the area in which the UE is being paged. As a general rule, the paging escalation sequence may or may not be known to the UE. For example, the paging escalation sequence may initially restrict paging to the one or more most-recent active cell of the UE, e.g., the one or more cells at which the UE has last communicated with the cellular NW, in particular transmitted to the NW so that its position is known. Then, if the cellular NW does not obtain a response from the UE when being paged in the most-recent active cell, the paging can be escalated, i.e., more and more cells can be instructed to page. Thus, the paging radius is iteratively extended as part of the paging escalation sequence.

As a general rule, the one or more most-recent active cells can be those cells on which the last known position or last known positions of the UE resided, e.g., the single last known position or a sequence of last known positions. Thus, the last communication(s) received by the cellular NW from the UE can define the one or more most-recent active cells. For instance, the one or more most-recent active cells can include such cells in which the UE last operated in the connected mode, prior to a transition to the disconnected mode. Thus, the most-recent active cell can be the particular cell at which the UE executed the transition from the connected mode to the disconnected mode. Another option involves the one or more most-recent active cells including such cells in which the UE has transmitted a measurement report and/or a paging-area update request message, e.g., using EDT in a RA procedure.

Various techniques described herein rely on WUS operation. As a general rule, the disconnected mode can be associated with the WUS operation. When the WUS operation is activated, the cellular NW transmits a WUS prior to a PO; and the UE monitors for the WUS. Here, a WUS is transmitted prior to a PO to inform one or more UEs of a WUS group that there is at least one UE in the WUS group that will be paged at the PO. As such, it can be said that the one or more UEs of the WUS group share the WUS. Sometimes, a dedicated WUS receiver (typically referred to as wake-up radio, WUR; sometimes also referred to as low-power receiver) is used detect the WUS. Then, at least one paging signal—e.g., a paging indicator and a paging message—can be transmitted at the PO. If the UE cannot detect a WUS in a scheduled time-frequency resource defined by a WUS configuration information of the WUS operation, then the UE will not attempt to decode paging signal and may continue to stay in inactive state. Thereby, the WUS operation generally helps to reduce the power consumption at the UE.

As a general rule, there are various options available for implementing the WUS. Typically, a modulation scheme of the WUS is comparably simple. A simple waveform results in a WUS that may be detected comparably with a lower UE processing complexity than other signals such as data reception. In particular, a sequence-based WUS may be used. The waveform of such a sequence-based WUS may be detectable using time-domain processing. Synchronization (e.g., in time domain) between a transmitter and a receiver may not be required or can be coarse. Yet, in other examples, synchronization may be required, e.g., if the WUS is transmitted using a connection control channel that uses, e.g., Orthogonal Frequency Division Multiplex (OFDM) modulation. Then, frequency-domain processing is required, including demodulation and decoding.

In further detail, the WUS operation may, in some examples, help to avoid blind decoding of a control channel during a PO. Since typically such blind decoding is comparably energy inefficient, thereby, power consumption can be reduced by using WUSs. This is explained in greater detail hereinafter: For example, in the 3GPP scenario, during POs, the UE is expected to blind decode the control channel, specifically the Physical DL Control Channel (PDCCH). The blind decoding during the POs is for a paging radio NW temporary identifier (P-RNTI) as paging identity, typically transmitted in as a so-called paging indicator. If presence of a paging indicator including the P-RNTI is detected, the UE continues to decode a subsequent data shared channel (e.g., Physical DL Shared Channel, PDSCH) for a paging message. The blind decoding is comparably energy inefficient and can be conditionally triggered by means of the WUS operation. i.e., by a preceding WUS. In other examples, the WUS can also be transmitted on a control channel, e.g., PDCCH. This is sometimes referred to as PDCCH-based WUS.

Various techniques are based on the finding that due to sharing a given WUS between multiple UEs of a WUS group, situations can occur in which a given UE of the WUS group receives the WUS and then continues to monitor for the paging signal; however that given UE is not actually paged (another UE of the WUS group is paged instead) so that the given UE will have spent energy on the monitoring of the paging signal even though it is not actually being paged.

Various techniques are based on the finding that it can be helpful to selectively activate or deactivate the WUS operation for a given UE depending on the particular location of the UE within a coverage area of the communications NW. More specifically—in the context of a cellular NW—various techniques are based on the finding that can be helpful to individually and selectively activate the WUS operation for a given UE in the various cells of the cellular NW. Thus, the WUS operation is activated for some cells, while it is deactivated for other cells.

It is possible that a NW node determines, for each one of one or more cells in the cellular NW and prior to paging the UE, whether to activate the WUS operation for the UE in at least one cell of the one or more cells. Then, the NW node can trigger a transmission of the WUS prior to a PO in the at least one cell in accordance with the WUS operation, upon determining that the WUS operation is to be activated in the at least one cell. Thus, the NW node—e.g., a mobility-control node—can determine the WUS strategy.

According to various techniques described herein, information is provided that defines whether WUS operation is activated for a specific UE in in the various cells of the cellular network. This information can be determined at the NW node. This information can also be predefined. This information will be generally referred to as WUS activation information. Thus, WUS operation is selectively activated or deactivated on UE-level and on cell level. In particular, WUS operation can be activated or deactivated for each individual UE and for each individual cell. This can be referred to as cell-selective and UE-selective activation of WUS operation.

The cell-selective and UE-selective activation of the WUS operation provides for increased flexibility when operating the UE in the disconnected mode. In particular, a trade-off situation can be flexibly addressed: (i) on the one hand, if WUS operation is deactivated for many UEs, then the number of UEs that share a WUS tends to decrease (assuming a fixed total number of UEs). This results in a decreased aggregate and per-UE time-averaged energy consumption for those UEs with activated WUS operation, because these UEs are less likely to respond to a WUS without being paged subsequently. At the same time, an increased energy consumption will result for those UEs that have deactivated WUS operation, since these UEs will have to blind decode PDCCH for monitoring the paging indicator without any prior notice. (ii) On the other hand, if more and more UEs have WUS operation activated, then there is a tendency that the number of UEs that share a WUS increases. This results in an increased aggregate and per-UE energy consumption for those UEs with activated WUS operation: there is an increased probability of a UE responding to a WUS even though not being paged subsequently. The aggregate and per-UE time-averaged energy consumption for UE is having deactivated WUS operation decreases, since they are fewer UEs having deactivated WUS operation. This trade-off assessment between (i) and (ii) indicates that there can be a sweet spot for the number of UEs that have WUS operation activated and deactivated, which sweet spot results in a reduced aggregate and per-UE time-averaged power consumption. According to the techniques described herein, it is possible to operate at or close to this sweet spot.

This consideration is paired with the finding that each UE can also be associated with a probability of being located in a given cell. Each UE exhibits a respective mobility pattern and the mobility pattern implies that a UE will not be present at similar probability in all cells across the cellular NW. For example, comparably static UEs are likely to be located in the most-recent active cell; while mobile UEs tend to move between cells. Then, taking such cell-dependent probability distribution of the UE location into account when activating or deactivating the WUS operation, it becomes possible to tailor the activation and deactivation of the WUS operation on cell level, so as to reduce the aggregate power consumption across an ensemble of UEs and thereby decrease the time-averaged power consumption per UE.

In detail, both the responsible NW node—e.g., a mobility control node or a BS—of the cellular NW, as well as the UE can obtain the WUS activation information and then activate or deactivate the WUS operation at their end accordingly.

For example, the UE can obtain the WUS activation information when preparing for a PO, and determine, based on the WUS activation information, whether the WUS operation is activated or not for its current cell. This can include determining the current cell, e.g., a cell identity, and comparing the cell identity with the WUS activation information. Upon determining that the WUS operation is activated, the UE can monitor for the WUS prior to the PO.

Likewise, a mobility-management node or another node of the cellular NW can determine for at least one cell of one or more cells (e.g., defining a paging area) whether the WUS operation is activated for the UE in the respective cell, e.g., based on the WUS activation information. Then, the transmission of a WUS can be triggered prior to the PO in those cells for which the WUS operation is activated.

The activation and deactivation of the WUS operation is aligned between the cellular NW and the UE. Such synchronized activation and deactivation of the WUS operation can be achieved based on signaling and/or a-priori knowledge. To give an example: it would be possible to communicate data that is indicative of the WUS activation information from the cellular NW to the UE and/or from the UE to the cellular NW, to synchronize the activation and deactivation of the WUS operation. It would also be possible that the data that is indicative of the WUS activation information is locally stored at the respective NW node and the UE and then loaded from the respective memory. Here, the WUS activation information can be fixedly defined in accordance with a communications standard.

As a general rule, there are various options available for activating and deactivating the WUS operation using the WUS activation information. Some of these options are described below, in connection with TAB. 1. The various variants of TAB. 1 can be combined with each other.

TABLE 1

Examples of cell-selective and UE-selective activation of WUS operation.

| Variant | WUS operation activated by WUS activation information ... | Explanation |
| --- | --- | --- |
| A | ... for one or more most-recent active cells. | The WUS operation is activated for the one or more most-recent active cells. For example, neighbor cells and optionally next-neighbor cells may also have WUS operation activated. I.e., a distance to one or more most-recent active cells may be considered. |
| B | ... depending on a position in paging escalation sequence. | cell-selective and UE-selective activation of WUS operation is aligned with paging operation, in particular the paging escalation sequence. For instance, if the cell is included at an early escalation stage of the paging escalation sequence, WUS operation can be activated; while WUS operation could be deactivated for cells included at a later stage of the paging escalation sequence. |
| c | ... depending on paging area. | cell-selective and UE-selective activation of WUS operation can take into account the position of a cell in a paging area, e.g., whether the cell is at the center or towards the border of the paging area. |
| D | ... depending on a mobility pattern of the UE. | It may be possible to take into account the mobility pattern of the UE. For example, a heading may be taken into account and WUS operation may be primarily activated for such cells aligned with the heading of the UE. |
| E | ... depending on an elapsed time since a trigger event. | It may be possible to specify a timeout time duration. For instance, WUS operation may only be activated for a certain time period starting with a trigger event, e.g., the transition of the UE from the connected mode to the disconnected mode. Another example trigger event could be an update of the paging area or transmission of a position report or measurement report from the UE to the cellular NW. After expiry of the timeout time duration, WUS operation may be fixedly deactivated at least for some cells or for all cells. |
| F | ... depending a wake-up signaling capability of the current cell,. | WUS operation can be deactivated for cells in accordance with the capability to support transmission of a WUS. |
| G | ... depending on a position of the plurality of cells with respect to mobility infrastructure. | It is possible to activate the WUS operation for such cells that have a mobility infrastructure-e.g., a highway or main road or a train track in the coverage and to deactivate the WUS operation for other cells. |

Referring to TAB. 1, variant A: The cell-selective and UE-selective activation of the WUS operation can restrict WUS operation to the one or more most-recent active cells. Therefore, if the UE is stationary—i.e., has a low UE mobility level—WUS operation will be activated and power consumption can be reduced.

There are various options available for implementing the one or more most-recent active cells. For example, the one or more most-recent active cells can include or be restricted to the last known serving cell in which the UE performed the transition from the connected mode to the disconnected mode. Alternatively or additionally, the one or more most-recent active cells can include or be restricted to such cells in which and/or for which the UE has transmitted a measurement report and/or a paging-area update request message, or there was another communication to and/or from the UE. This may be done using EDT during the RA procedure. Generally speaking, the one or more last-active cells can include such cells in which the UE has communicated with the cellular NW during a predetermined time duration or since occurrence of a trigger event. An example trigger event can involve the transition to the disconnected mode or a specific type of mobility report, etc. The predetermined time duration can specify a sliding window timeframe during which transmissions from the UE are taken into account.

Next, a few examples for the implementation of the cell-selective and UE-selective activation of the WUS operation are provided for variant A in TAB. 2.

TABLE 2 cell-selective and UE-selective activation of WUS operation depending on most-recent active cell(s) and variants thereof (cf. TAB. 1, variant A).

| Variant | WUS operation is activated . . . |
|---|---|
| A-1 | . . . only for the single most-recent active cell in which the UE operated in the connected mode. |
| A-2 | . . . for the most-recent active cell on which the UE was in connected mode plus a number of neighbor cells signalled to the UE when transitioning from the connected mode to the disconnected mode. |
| A-3 | . . . for the most-recent active cell and the cells for which the UE reported neighbor cell measurements to the cellular NW when the UE operated in the connected mode the last time. |
| A-4 | . . . for the most-recent active cells including a number of cells in which the UE has been in connected mode performing neighbor cell measurements within a predetermined time duration, e.g., in the past X hours or days. |
| A-5 | . . . for the most-recent active cell and the limited number of cells following a mobility infrastructure in the coverage area of the cellular NW - e.g., a main road or a train track - based on the localization of the most-recent active cell. These cells may be known to the UE based on the UE tracking its behavior. These cells may also be signaled to the UE, as part of the WUS activation information. |

Thus, as apparent from TAB. 2, based on the WUS activation information, the UE can be aware that the WUS operation is limited to a few cells at or around the one or more most-recent active cell of the UE. The WUS activation information can be based on that the cellular NW knows in what one or more most-recent active cells the UE was in connected mode.

Now referring to TAB. 1, variant B: The cell-selective and UE-selective activation of the WUS operation can be determined based on the paging operation. In particular, the WUS operation can be selectively activated depending on a position of the cells of the plurality of cells of the cellular NW in the paging escalation sequence. For instance, WUS operation can be activated for those cells at the beginning of the paging escalation sequence; but may be deactivated for cells at the end of the paging escalation sequence.

In accordance with the WUS activation information, it can then be determined whether the WUS operation is to be activated or not in the larger areas associated with an escalated paging procedure, in view of the risk that the transmission of a WUS results in more and more UEs to be falsely woken up.

Thereby, WUS operation is not used in a comparably wide area associated with the cells towards the end of the paging escalation sequence. The reason is that the number of UEs reading paging during the same PO increases substantially with the larger paging area.

Thus, it is possible that the cellular NW can select whether the WUS should be used when escalating a paging to a larger area.

Finally, e.g., the paging is escalated to the entire paging area, e.g., the entire TA. Throughout the paging escalation sequence, the cellular NW can select for which cells of the cellular NW the WUS operation shall be activated, to thereby have a good trade-off between power consumption of the actual UE that is paged and the remaining UEs.

Thus, even when the paging is escalated to larger areas, the cellular NW can be able to specifically point out in which cells the WUS operation should be activated.

As an addition, to limit unnecessary wake-up of multiple UEs using WUSs, it would be possible that after completing unsuccessfully the paging in the first one or more cells of the paging escalation sequence, the paging operation stops the paging in these first one or more cells upon escalating the paging to a larger area. Thereby, the paging of the UE does not result in further WUS activity that can falsely wake up other UEs. This is associated with the assumption that—upon so on so many unsuccessful attempts to page the UE and the most-recent active cell and/or its neighbors—it can be assumed that the UE is not located at this area, but has moved on. Such a paging escalation sequence can be referred to as gradually progressive.

Next, a few examples regarding the implementation of the WUS activation information are discussed, in connection with TAB. 3.

TABLE 3

Implementation variants of the WUS activation information

| Variant | Implementation of WUS activation information | Explanation |
|---|---|---|
| A | derivation rule | Corresponds to implicit logic or derivation rules so that the UE can calculate based on certain parameters in which cells of the cellular NW the WUS operation is |

TABLE 3-continued

Implementation variants of the WUS activation information

| Variant | Implementation of WUS activation information | Explanation |
|---|---|---|
| | | activated for that specific UE. The derivation rule can specify one or more criteria for activating the WUS operation. The derivation rule can be specified in accordance with a communications protocol of a communications standard. May be fixed. It would also be possible that one or more criteria of the derivation rule are signaled. The derivation rule could be dependent on a timer value, e.g., counting the time since last operating in the disconnected mode. Another criterion to be considered in the derivation can be mobility parameters of the UE, e.g., counting the number of cell changes, path information indicating in advance in which cells the WUS will be used. Further example criteria include, e.g., distance to most-recent active cell or cells, elapsed time since trigger event, position with respect to mobility infrastructure, position in paging area, position in paging escalation sequence, etc.. |
| B | look-up-table | Explicit indication, e.g., provided by the cellular NW. For example, {[Cell A; 1 ];[Cell B; 0]; [Cell C; 1]; ....}, where "1" is indicative of activated WUS operation and "0" is indicative of deactivated WUS operation. |
| C | logical bitmap | Explicit indication, e.g., provided by the cellular NW. The logical bitmap can specify, for a list of cells, whether the WUS operation is activated or deactivated, e.g., {0; 1; 1 ;0;....} , where "1" is indicative of activated WUS operation and "0" is indicative of deactivated WUS operation. |
| D | index of a codebook of derivation rules | Explicit indication, e.g., provided by the cellular NW. |
| E | list of cells | Explicit indication, e.g., provided by the cellular NW. |
| F | One or more criteria for activating the WUS operation | The WUS activation information can be indicative of one or more criteria that specify whether to activate or deactivate the WUS operation for individual cells. Example criteria include, e.g., distance to most-recent active cell or cells, elapsed time since trigger event, position with respect to mobility infrastructure, position in paging area, position in paging escalation sequence, etc.. |

The WUS activation information can be a static rule, e.g., could fixedly specify—e.g., in accordance with a communication standard of the protocol followed by the UE and the cellular NW. The WUS activation information can then be loaded from a local memory in accordance with the communications protocol. The WUS activation information can thus be available as a-priori knowledge. For example, the static rule could specify that the WUS operation is only activated in one or more most-recent active cells in which the UE operated in the connected mode prior to the transition to the disconnected mode (cf. TAB. 3, variant A or F).

The WUS activation information could also be partly or fully signaled from the cellular NW to the UE (or vice versa). Thus, the UE may obtain the WUS activation information by receiving data indicative of the WUS activation information. The respective NW node may transmit the data. For example, a derivation rule or a lookup table or another list of cells—or generally data indicative of the WUS activation information—may be broadcasted by the cellular NW in a systems information block or communicated prior to the transition from the connected mode to the disconnected mode (cf. TAB. 3, variants B-E). The data indicative of the WUS activation information may be included in a connection control message (e.g., a 3GPP RRC control message or Non-Access Stratum, NAS, control message) associated with the data connection used in the connected mode. The connection control message may be a data connection deactivation message to transition to the disconnected mode. The data could also be included in a paging area update message, e.g., a TAU message or a RNA update message. The cellular NW may signal the WUS activation information to the UE when the cellular NW releases the UE from the data connection, i.e., during the transition from the connected mode to the disconnected mode.

The WUS activation information could be implicitly signaled, e.g., the cellular NW may transmit or broadcast one or more criteria of a derivation rule such that the UE can calculate or determine the cells in which the WUS operation is activated (cf. TAB. 3, variant A). For instance, it would be possible that a codebook of candidate derivation rules is used and the cellular NW may signal an index so that the UE can select the appropriate derivation rule—along with the respective one or more criteria—from the codebook of candidate derivation rules (cf. TAB. 3, variant D).

Summarizing, the techniques described above generally correspond to defining a cell-selective and UE-selective activation of the WUS operation. Thereby, the number of users per WUS can be limited to a number of cells based on smart paging strategies, e.g., based on history and known patterns.

FIG. 1 schematically illustrates a cellular NW 100. The example of FIG. 1 illustrates the cellular NW 100 according to the 3GPP 5G architecture. Details of the 3GPP 5G architecture are described in 3GPP TS 23.501, version 16.3.0 (2019 December). While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 101 is connectable to the cellular NW 100. For example, the UE 101 may be one of the following: a cellular phone; a smart phone; an IOT device; a MTC device; a sensor; an actuator; etc. The UE 101 has a respective identity 451, e.g., a subscriber identity.

The UE 101 is connectable to a core NW (CN) 115 of the cellular NW 100 via a RAN 111, typically formed by one or more BSs 112 (only a single BS 112 is illustrated in FIG. 1 for sake of simplicity). A wireless link 114 is established between the RAN 111—specifically between one or more of the BSs 112 of the RAN 111—and the UE 101.

To perform channel sounding, it is possible to that the BS 112 provides one or more transmissions of one or more RSs. The one or more RS can be indicative of an identity of the respective cell. Thereby, the UE 101 can determine the current cell.

The wireless link 114 implements a time-frequency resource grid. Typically, Orthogonal Frequency Division Multiplexing (OFDM) is used: here, a carrier includes multiple subcarriers. The subcarriers (in frequency domain) and the symbols (in time domain) then define time-frequency resource elements of the time-frequency resource grid. Thereby, a protocol time base is defined, e.g., by the duration of frames and subframes including multiple symbols and the start and stop positions of the frames and subframes. Different time-frequency resource elements can be allocated to different logical channels of the wireless link 114. Examples include: Physical DL Shared Channel (PDSCH); Physical DL Control Channel (PDCCH); Physical UL Shared Channel (PUSCH); Physical UL Control Channel (PUCCH); channels for random access; etc.

The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data NW 180, e.g., the Internet or a Local Area NW. Application data can be communicated between the UE 101 and one or more servers on the data NW 180.

The cellular NW 100 also includes a mobility-control node, here implemented by an Access and Mobility Management Function (AMF) 131 and a Session Management Function (SMF) 132.

The cellular NW 100 further includes a Policy Control Function (PCF) 133; an Application Function (AF) 134; a NW Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: connection management sometimes also referred to as registration management; NAS termination for communication between the CN 115 and the UE 101; connection management; reachability management; mobility management; connection authentication; and connection authorization. For example, the AMF 131 controls CN-initiated paging operation for the UE 101, if the respective UE 101 operates in the disconnected mode. The AMF 131 can control the WUS operation for the UE 101, at least in some operational modes. The AMF 131 may trigger transmission of paging signals to the UE 101 and, —if the WUS operation is activated for the respective cell(s)—transmission of a WUS; transmission of paging signals and WUSs may be time-aligned with POs. The timing of the POs can be determined based on the UE identity 451. After UE registration to the NW, the AMF 131 creates a UE context 459 and keeps this UE context, at least as long as the UE 101 is registered to the NW. The UE context could specify for which cells paging operation and WUS operation is activated.

A data connection 189 is established by the SMF 132 if the respective UE 101 operates in the connected mode. The data connection 189 is characterized by UE subscription information hosted by the UDM 137. To keep track of the current mode of the UE 101, the AMF 131 sets the UE 101 to CM-CONNECTED or CM-IDLE. During CM-CONNECTED, a NAS connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The data connection 189 is established between the UE 101 and the RAN 111 and on to the UP 191 of the CN 115 and towards the DN 180. For example, a connection with the Internet or another packet data NW can be established. To establish the data connection 189, i.e., to connect to the cellular NW 100, it is possible that the respective UE 101 performs a RA procedure, e.g., in response to reception of a paging signal or in response to UE-originating UL data being buffered for transmission. This establishes at least a RAN-part of the data connection 189. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model.

Figure 2:
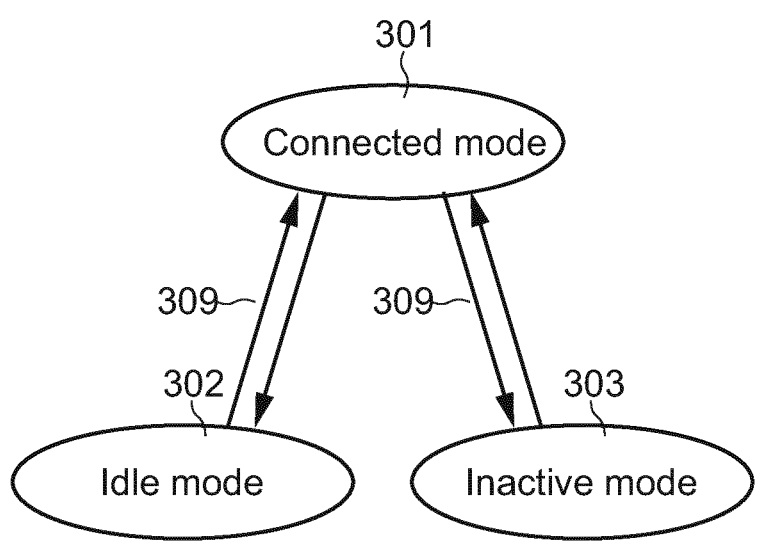
FIG. 2 schematically illustrates multiple operational modes in which a UE connectable to the cellular NW can operate according to various examples.

FIG. 2 schematically illustrates aspects with respect to multiple operational modes 301-303 in which a UE can operate.

The data connection 189 is established in the connected mode 301. In particular, a RAN-part of the data connection 189 is established in the connected mode 301. Data can be communicated between the UE 101 and the BS 112 using PDSCH, PDCCH, PUSCH, PUCCH. RRC control messages can be communicated on PDSCH and/or PUSCH. It is possible to use connected-mode DRX. The connected mode 301 can be implemented by the 3GPP RRC_Connected.

FIG. 2 also illustrates two disconnected modes 302-303. A first disconnected mode is the idle mode 302, e.g., implemented by 3GPP RRC_Idle. A second disconnected mode is the inactive mode 303, e.g., implemented by 3GPP RRC_Inactive. Typically, the inactive mode 303 is transparent to the CN 115, while the idle mode 302 is signaled to the CN 115. Thus, the UE context 459 may be maintained at the CN 115 when the UE 101 operates in the inactive mode 303.

FIG. 2 also illustrates aspects with respect to the transitions 309 between the various modes 301-303. For instance, to trigger the transition 309 from the connected mode 301 to one of the disconnected modes 302-303, a connection deactivation message can be communicated, e.g., using RRC control signaling on the PDSCH or PUSCH. This may be a connection inactivate control message for the transition 309 to the inactive mode 303; or a connection release message for the transition 309 to the idle mode 302. The connection release message triggers release of the data connection 189. The connection deactivation message can include an information element that carries additional data.

The transition 309 from the idle mode 302 or the inactive mode 303 to the connected mode 301 includes a RA procedure. The RA procedure may be triggered by paging signals, e.g., a paging indicator on PDCCH and a paging message on PDSCH. In the inactive mode 303, paging can be triggered by the RAN; while in the idle mode 302 the paging is triggered by the CN.

The paging signals are transmitted at POs. The timing of the POs is determined depending on the identity 451 of the UE 101. The UE 101 can configure a DRX cycle in accordance with the timing of the POs. In particular, the UE 101 can control its wireless interface such that it is in the active state and ready to receive data—e.g., by blind decoding PDCCH for the paging indicator—at the start of the ON period of the DRX cycle.

The disconnected modes 302-303 may be combined with WUS operation. I.e., it is possible that a WUS is transmitted prior to the PO. The WUS may be transmitted on PDCCH or a distinct WUS channel. The WUS may be sequence-based for time-domain reception; or may require frequency-operation for reception using a synchronization with the cellular NW 100. Prior to a PO, a WUS may be transmitted, in case the WUS operation is activated for a given UE in a given cell. The transmission of a WUS can be triggered by the CN, e.g., the AMF 131. It would also be possible that the transmission of the WUS is triggered at the RAN 111.

In some examples, it is alternatively or additionally possible to use WUS operation in the connected mode 301 employing DRX.

Figure 3:
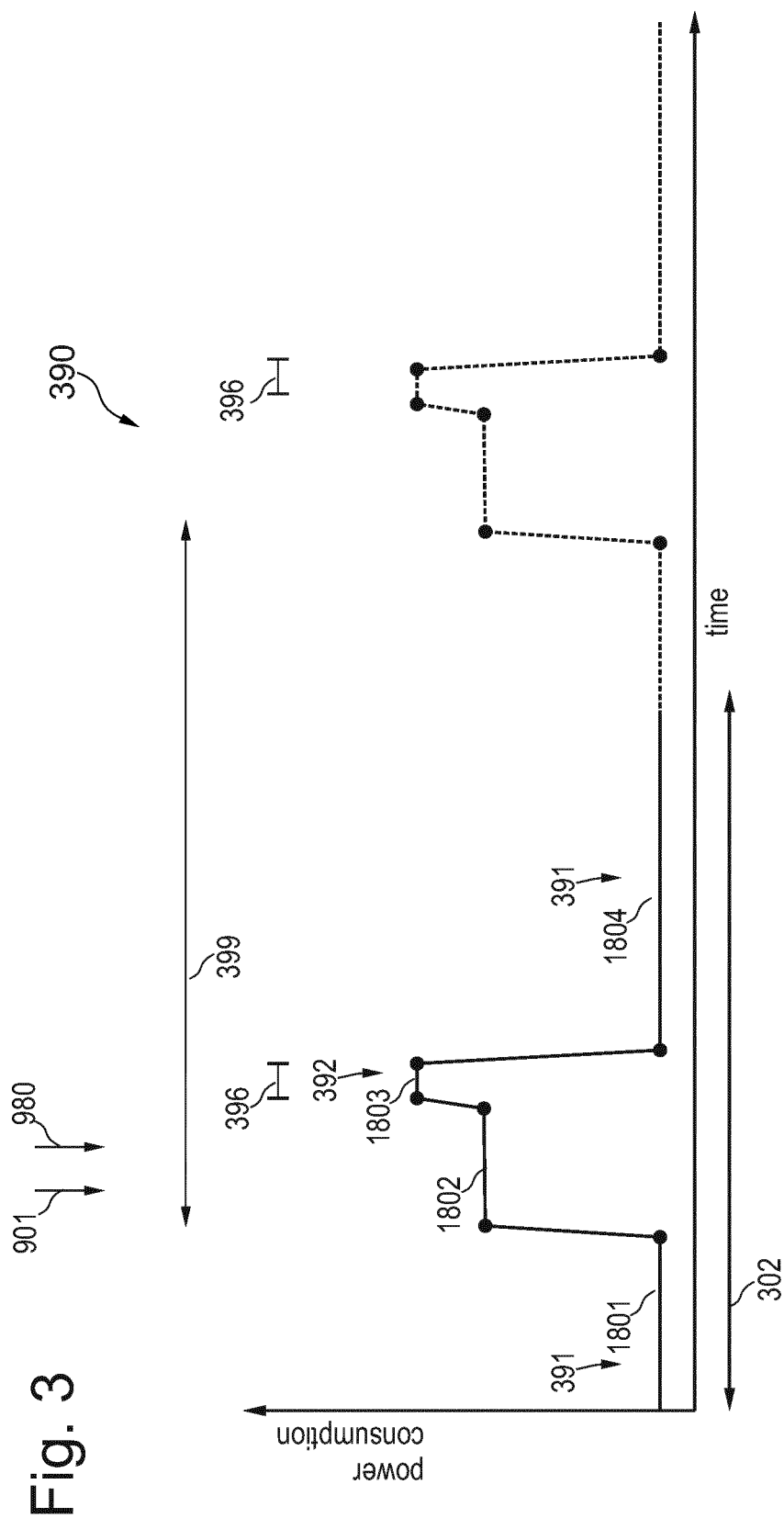
FIG. 3 schematically illustrates a DRX cycle associated with a disconnected mode according to various examples and further illustrates a wake up signal according to various examples.

FIG. 3 schematically illustrates aspects with respect to a DRX cycle 390. The DRX cycle 390 can be used by the UE 101 in one or both of the disconnected modes 302-303, or even in the connected mode 301. FIG. 3 illustrates activity of the various components of the wireless interface of the UE 101 as a function of time, to implement a DRX cycle 390. More specifically, FIG. 3 illustrates the activity of the various components of the wireless interface by indicating the UE power consumption.

When using the DRX cycle 390, the UE 101 periodically transitions a modem of its wireless interface between an inactive state 391 (during time periods 1801 and 1804 in FIG. 3) and an active state 392 (during time period 1803 in FIG. 3). The time periods 1801 and 1804 correspond to OFF periods of the DRX cycle 390; and the time period 1803 corresponds to an ON period of the DRX cycle 390. The time period 1803 of the active state 392 is time-aligned with a PO 396 during which the cellular NW 100 can send the paging signal(s). FIG. 3 illustrates a corresponding cycle duration 399 of the DRX cycle 390, i.e., the periodicity or duration of individual periods of the DRX cycle 390.

The timing of the PO 396 is given (for the example of 3GPP NR) by (i) the System Frame Number (SFN) and (ii) the subframe within this frame and (iii) the UE_ID, which is derived from the respective identity 451 of the UE 101.

The UE 101 cannot receive paging signals when operating the modem in the inactive state 391; for example, an analog front end and/or a digital front end of the modem may be powered down. For example, amplifiers and analog-to-digital converters may be switched off. For example, decoding digital blocks may be switched off. A high-speed clock can be switched off and rather a low-speed clock, e.g., 32 kHz RTC clock can be used. For example, the UE 101 may be operated with a simple receiver that require low power consumption, such as operating in low sampling rate. The UE 101 hardware is entering the inactive state 391 when it is possible to save power. When the UE hardware is in the inactive state 391, one or more clocks may be turned off, all radio blocks and most modem blocks may be turned off, just minimum activity with a low frequency (RTC) clock to start the platform when it is time for the next PO 396 may be maintained. Accordingly, the inactive state 391 is associated with a comparably small power consumption.

When operating the modem in the active state 392, the UE 101 can monitor for paging signals. The various hardware components of the modem of the wireless interface are powered up and operating. For example, the UE 101 can perform blind decoding of the PDCCH to detect a paging indicator. The active state 392 is accordingly associated with a comparably high power consumption.

As illustrated in FIG. 3, there is a time period 1802 required to transition the UE 101 from the inactive state 391 to the active state 392 (wake-up time). This transition can require frequency and timing to be (re-)adjusted and the modem to be started to be able to receive paging signals. The UE 101 can receive one or more RSs 901 during the time period 1802, to (re-)synchronize. Based on the RSs 901 the UE 101 can also determine the current cell, i.e., a cell identity of the respective cell encoded by the RS 901.

In FIG. 3, the UE 101 can also receive a WUS 980, depending on whether the WUS operation is activated or not. Sometimes, it is even possible that synchronization is established based on the WUS 980, in which case it is not required to receive the additional RS 901. The RS 901 may be integrated into the WUS 980.

In the scenario of FIG. 3, the UE 101 does not receive a paging signal during the time period 1803; and, accordingly, transitions back into the inactive state 391 during the time period 1804. The procedure is repeated after the periodicity 399 of the DRX cycle 390 (as illustrated by the dashed line of FIG. 3). Once a paging indicator is detected, the UE 101 next reads a paging message on the PDSCH or a paging channel (PCH) (not illustrated). Based on the paging message, the data connection 189 can be set up, e.g., using a RA procedure.

Figure 4:
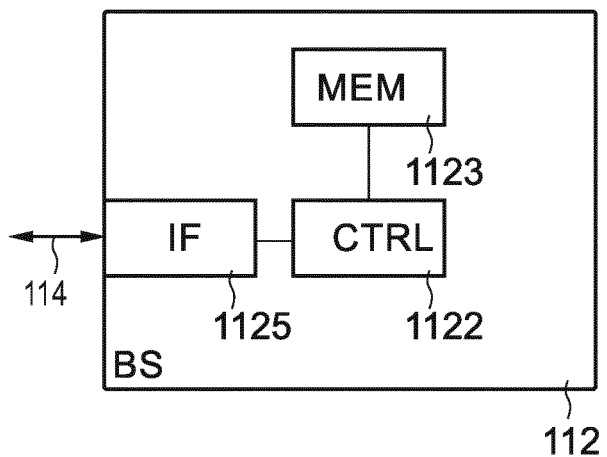
FIG. 4 schematically illustrates a base station of the cellular NW according to various examples.

FIG. 4 schematically illustrates the BS 112. The BS 112 includes control circuitry 1122 that can load program code from a memory 1123. The BS 112 also includes an interface 1125 that can be used to communicate on the wireless link 114 with the UE 101 or nodes of the CN 115 of the cellular NW 100. As such, the interface 1125 can include an analog front end and a digital front end, as well as antenna ports, etc., for communicating on the wireless link 114. The control circuitry 1122 can load program code from the memory 1123 and execute the program code. Upon executing the program code, the control circuitry 1122 can perform techniques as described herein, e.g.: obtaining WUS activation information for a given UE; configuring the WUS operation in accordance with the WUS activation information; triggering paging of a UE in multiple cells of a paging area, e.g., based on a paging escalation sequence, which may include transmitting respective paging messages to multiple BSs of the respective cells; transmitting a paging signal upon being triggered to do so; activating the WUS operation for at least some of the multiple cells of the paging area, in accordance with the WUS activation information; determining the WUS activation information, based on one or more parameters such as a traffic load in the cells of the paging area, number of UES operating in a disconnected mode in the cells of the paging area, a number of UEs sharing a WUS, a paging escalation sequence of the paging operation, and/or a mobility pattern of the UE.

Figure 5:
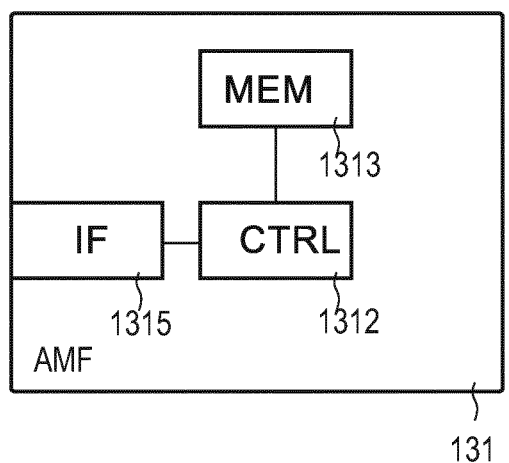
FIG. 5 schematically illustrates a mobility control node of the cellular NW according to various examples.

FIG. 5 schematically illustrates the AMF 131. The AMF 131 includes control circuitry 1312 that can load program code from a memory 1313. The AMF 131 also includes an interface 1315 that can be used to communicate with nodes of the cellular NW 100, e.g., the BS 112. The control circuitry 1312 can load program code from the memory 1313 and execute the program code. Upon executing the program code, the control circuitry 1312 can perform techniques as described herein, e.g.: obtaining WUS activation information for a given UE; configuring the WUS operation in accordance with the WUS activation information; triggering paging of a UE in multiple cells of a paging area, e.g., based on a paging escalation sequence, which may include transmitting respective paging messages to multiple BSs of the respective cells; activating the WUS operation for at least some of the multiple cells of the paging area, in accordance with the WUS activation information; determining the WUS activation information, based on one or more parameters such as a traffic load in the cells of the paging area, number of UEs operating in a disconnected mode in the cells of the paging area, a number of UEs sharing a WUS, a paging escalation sequence of the paging operation, and/or a mobility pattern of the UE.

Figure 6:
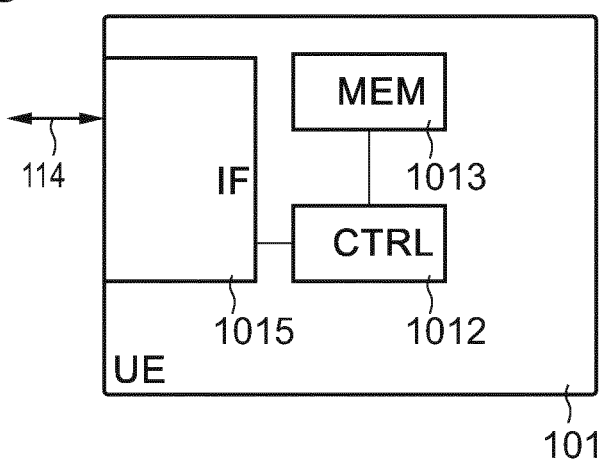
FIG. 6 schematically illustrates a UE according to various examples.

FIG. 6 schematically illustrates the UE 101. The UE 101 includes control circuitry 1012 that can load program code from the memory 1013. The UE 101 also includes a wireless interface 1015 that can be used to communicate on the wireless link 114 with the BS 112 of the cellular NW 100. As such, the wireless interface 1015 can include an analog front end and a digital front end, as well as antenna ports, etc. The control circuitry 1012 can load program code from the memory 1013 and execute the program code. Upon executing the program code, the control circuitry 1012 can perform techniques as described herein, e.g.: monitoring for a RS, e.g., when operating in a disconnected mode 302-303; obtaining a WUS activation information e.g., by loading respective data from the memory 1013 and/or by receiving respective data form the cellular NW 100.

Figure 7:
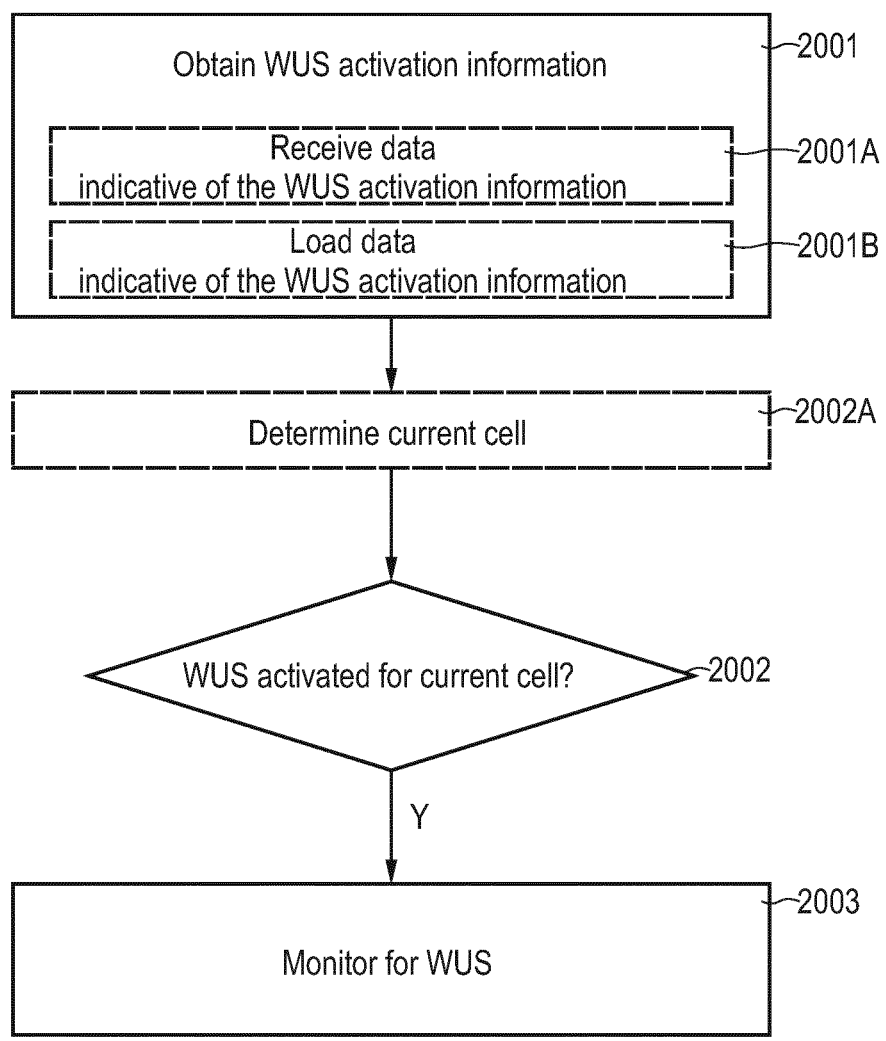
FIG. 7 is a flowchart of a method according to various examples.

FIG. 7 is a flowchart of an example method. The method of FIG. 7 is executed by a UE. The method of FIG. 7 could be executed by the UE 101 (cf. FIG. 1 and FIG. 6). More specifically, it would be possible that the method of FIG. 7 is executed by the control circuitry 1012 of the UE 101 upon loading program code from the memory 1013.

The UE is connectable to a cellular NW including multiple cells. Paging operation can be activated for the UE. Paging operation can include the cellular NW transmitting one or more paging signals and the UE monitoring for the one or more paging signals. Paging operation can include definition of one or more paging areas including one or more cells. Paging operation can include definition of paging occasions with defined time-frequency resources for the one or more paging signals. The cells of the cellular NW can be partitioned into paging areas of the paging operation. A given paging area can be associated with the paging operation for the UE, when operating in a disconnected mode.

At box 2001, information is obtained that defines whether a WUS operation is activated for the UE in individual cells. For example, this WUS activation information may be indicative of whether WUS operation is activated for each cell located within a paging area of a paging operation configured for the UE. Thus, the WUS activation information can include a multi-cell indicator. For instance, the WUS operation may be activated for a first fraction of cells of the plurality of cells and may be deactivated for a second fraction of cells of the plurality of cells.

As a general rule, there are various implementations conceivable for the WUS activation information, some examples have been discussed in connection with TAB. 3 above.

The WUS activation information accordingly may include a derivation rule, a lookup table, a logical bitmap (e.g., includes "TRUE" and "FALSE" entries for multiple cells), an index of a codebook of derivation rules, or a list of cells. The WUS activation information may include one or more criteria for activating the WUS. The criteria may be parameterized such that by checking a current value of such parameters, it is possible to decide whether WUS operation is activated or not.

Obtaining the WUS activation information that box 2001 can include receiving data that is indicative of the WUS activation information to or from the cellular NW, optional box 2001A. For instance, the data could be at least partly communicated when the UE operates in a connected mode, prior to a transition to a disconnected mode, wherein the disconnected mode is associated with the WUS operation (example disconnected modes 302-303 have been discussed above in connection with FIG. 2). It would be possible that the state that is indicative of the WUS activation information is at least partly included in a connection control message that is associated with a data connection established when operating in the connected mode, i.e., prior to the transition to the disconnected mode (details with respect to such a data connection 189 have been discussed above in connection with FIG. 1). Here, it would be possible that the connection control message is a connection deactivation message triggering the transition to the disconnected mode, by releasing the data connection 189. In other examples, it would be possible that the data is at least partly included in a broadcasted information block or a paging area update message. An example of the broadcasted information block would be a systems information block (SIB). The SIB can thus tell the UE which cell or cells have WUS operation activated.

It is not required in all scenarios that the data is communicated. In some examples, the data may, at least partly, loaded from a local memory, box 2001B. Here, it would be possible that the WUS activation information is predefined in accordance with a communications protocol communications standard. As such, a fixed WUS activation information may be used.

The method then commences at box 2002. At box 2002, the UE determines whether the WUS operation is activated for the current cell. This may involve determining the current cell, see optional box 2002A. The current cell can be determined based on a broadcasted signal. For example, the current cell can be determined based on an always-on signal that is repeatedly transmitted. For example, the current cell could be determined based on a primary synchronization signal (PSS) or a secondary synchronization signal (SSS) broadcasted by the cellular NW. The current cell could be determined based on a mobility assumption, e.g., by odometry and/or positioning data. Other positioning techniques may be used.

Then, the UE can compare the current cell with the WUS activation information. More specifically, in a scenario in which the WUS activation information is implemented by a derivation rule, the UE may execute the derivation rule and obtain an output, the output being indicative of one or more cells in which the WUS operation is activated. Then, the UE could compare the output of the derivation rule with the current cell to identify whether the WUS operation is activated for the current cell.

Then, at box 2003, in case it determines that the WUS operation is activated, the UE monitors for the WUS. This can be in advance of a PO, as explained in connection with FIG. 3. For example, time-domain processing may be employed. It would be possible that the UE is synchronized with the cellular NW to receive the WUS, e.g., based on a reference signal that is received prior to said monitoring for the WUS.

The UE does not monitor for the WUS in case it determines that the WUS operation is deactivated for the current cell. In such a scenario the UE may proceed with, e.g., monitoring for a paging signal during the PO, i.e., skip monitoring for the WUS (not illustrated in FIG. 7).

Figure 8:
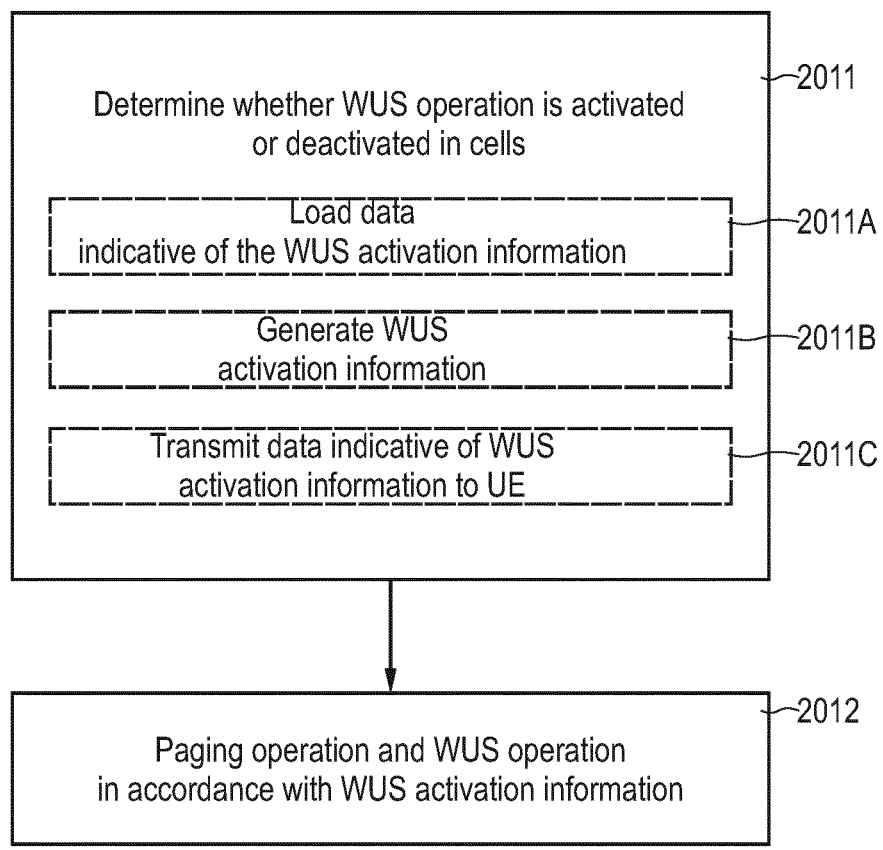
FIG. 8 is a flowchart of a method according to various examples.

FIG. 8 is a flowchart of a method according to various examples. The method of FIG. 8 can be executed by a NW node of a cellular NW. For instance, the method of FIG. 8 could be executed by a BS of a radio access NW of the cellular NW. For example, the method of FIG. 8 could be executed by the BS 112 (cf. FIG. 1; FIG. 4); or more specifically, the method of FIG. 8 could be executed by the control circuitry 1122 of the BS 112 upon loading program code from the memory 1123. In other examples, it would be possible that the method of FIG. 8 is executed by a mobility-control node arranged in the core of the cellular NW. For example, it would be possible that the method of FIG. 8 is executed by the AMF 131 (cf. FIG. 1; FIG. 5); more specifically, it would be possible that the method of FIG. 8 is executed by the control circuitry 1312 of the AMF 131 upon loading program code from the memory 1013.

At box 2011, it is determined, for each one of one or more cells of the cellular NW, whether to activate a WUS operation for a UE or not in the respective cell. In other words, for each cell, where the cellular NW intends to page the UE, it determines whether it shall activate WUS in the cell or not. In principle it is the cellular NW that determines its paging strategy. However, the paging strategy might be limited by certain constraints, which are for example defined in a standard.

This determining can be based on WUS activation information; in such scenario, the WUS activation information may be obtained, e.g., loaded from a memory or received from the UE, see optional box 2011A. Then, the node uses the WUS activation information to determine whether to activate the WUS operation in each one of the cells. Alternatively, it would be possible to derive/generate the WUS activation information based on such determining, see optional box 2011B; then, it would be possible to provide the WUS activation information to the UE. As part of box 2011, it would be possible to signal data that is indicative of the WUS activation information to the UE, see optional Box 2011C. As such, box 2011 is inter-related with box 2001 (cf. FIG. 7).

When determining whether to activate the WUS operation for the UE at box 2011, in particular when determining the WUS activation information, one or more criteria may be taken into consideration. Example criteria include, e.g., a traffic load (there may be a tendency to deactivate the WUS operation for increasing traffic load, to free up resources), a number of UEs operating in a disconnected mode for a given cell (there may be a tendency to deactivate the WUS operation for an increasing number of UEs operating in a disconnected mode for a given cell, in order to avoid unnecessarily waking up multiple UEs that share the WUS), a paging escalation sequence for paging the UE (it would be possible that the WUS operation is activated for those cells at the beginning of the paging escalation sequence, while it is deactivated for those cells towards the end of the paging escalation sequence), or a mobility pattern of the UE (there can be a tendency to activate the WUS operation for those cells that, based on the mobility pattern, have a high probability of the UE location residing in the respective coverage area).

At box 2012, paging operation and WUS operation commences, when the UE operates in a disconnected mode. In particular, the paging operation can include a paging escalation sequence for paging the UE. The WUS operation includes triggering transmission of a WUS in the one or more cells prior to PO to the UE. In particular, the WUS operation is selectively activated or deactivated on a cell level, depending on the determining of box 2011. This can be in accordance with the WUS activation information.

Figure 9:
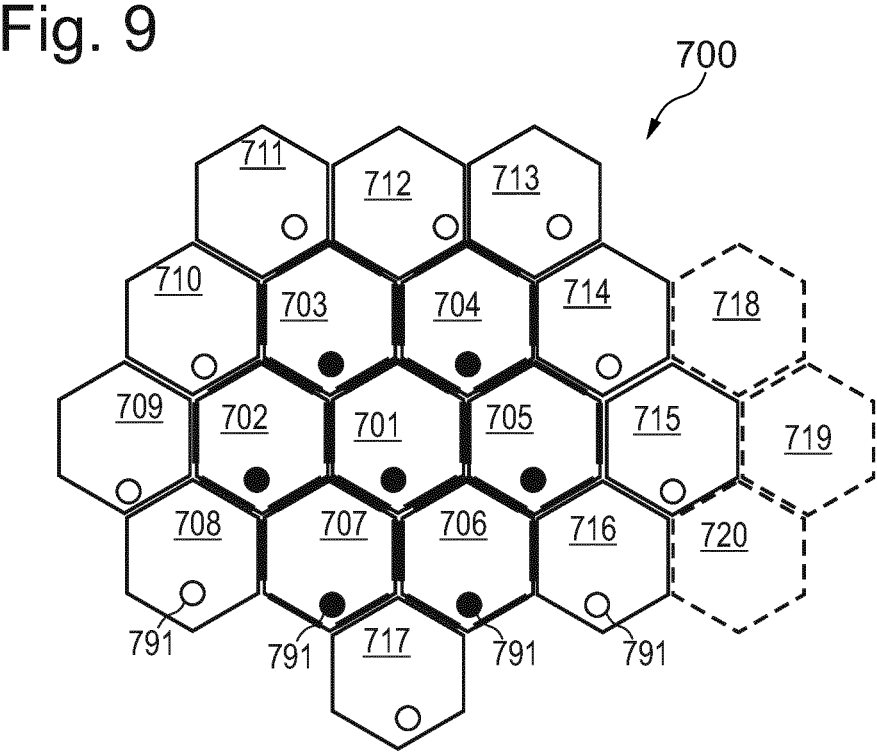
FIG. 9 schematically illustrates cells of the cellular NW, paging operation, and selective activation/deactivation of a WUS operation according to various examples.

FIG. 9 illustrates aspects with respect to cells 701-720 of the cellular NW 100 (cf. FIG. 1). As illustrated in FIG. 9, the cells 701-720 define a coverage area of the cellular NW 100.

There is a most-recent active cell 701 at which, e.g., the UE 101 performed the transition 309 from the disconnected mode 302-303 to the connected mode 301. For example, this may have involved a communication of a connection deactivation message, to deactivate the data connection 189, at least along the wireless link 114.

It is possible that the UE 101 has transmitted measurement reports of neighboring cells 702-707 so that it can be determined that the cells 702-707 are nearest neighbors to the most-recent active cell 701.

FIG. 9 also illustrates aspects with respect to a paging area 700. In the example of FIG. 9, the paging area 700 is centered around the most-recent active cell 701 and includes multiple cells 701-717. The cells 718-720 are not part of the paging area 700 (upon entering one of the cells 718-720, a paging area update may be executed to receive a new paging area).

It would be possible that the paging operation in the paging area 700 is associated with a paging escalation sequence, as illustrated in TAB. 4 below.

TABLE 4

Paging escalation sequence, gradually-progressive

| Escalation stage | Cell 701 (most-recent active cell) | Cells 702-707 (neighbor cells) | Cells 708-717 (other cells) |
|---|---|---|---|
| A | Page | No Page | No page |
| B | No-Page | Page | No Page |
| C | No page | No page | Page |

As can be seen from TAB. 4, the paging escalation sequence progressively extends the paging radius around the most-recent active cell 701. The paging escalation sequence as illustrated in TAB. 4 is configured as gradually-progressive, because the cells paged in a previous stage are not paged in a subsequent stage. In contrast to the gradually-progressive paging escalation sequence, TAB. 5 illustrates a gradually-expansive paging escalation sequence.

TABLE 5

Paging escalation sequence, gradually-expansive

| Stage | Cell 701 (most-recent active cell) | Cells 702-707 (neighbor cells) | Cells 708-717 (other cells) |
|---|---|---|---|
| A | Page | No Page | No page |
| B | Page | Page | No Page |
| C | Page | Page | Page |

FIG. 9 also illustrates aspects with respect to the WUS activation information 791. In particular, as illustrated in FIG. 9, the WUS operation is activated for some cells 701-707 (illustrated by the filled circles), and is deactivated for other cells 708-717 (illustrated by the empty circles).

In the example of FIG. 9, the WUS activation information is defined for the cell 701-707 within the paging area 700. In particular, the WUS activation information 791 depends on the most-recent active cell 701. Specifically, the WUS activation information 791 activates the WUS operation for the most-recent active cell 701 and the nearest-neighbor cells 702-707. For example, the WUS activation information 791 may be implemented in a parametrized manner by specifying a criterion of a derivation rule that depends on the most-recent active cell, e.g., in accordance with:

"if current_cell is last connected cell or neighbor cell, then active WUS operation else deactivate WUS operation"

The WUS activation information 791 deactivates the WUS operation for cells 708-717 at the periphery of the paging area 700; as such, the WUS activation information 791 depends on the paging area 700. For example, the WUS activation information 791 may be implemented in a parametrized manner by specifying a criterion of a derivation rule that depends on the position in the paging area, e.g., in accordance with:

"if current_cell is at border of paging area, then deactivate WUS operation else activate WUS operation"

Likewise, the WUS activation information 791 activates the WUS operation depending on a position of the cells 701-717 in the paging escalation sequence (cf. TAB. 4 and TAB. 5). By using a gradually-progressive paging escalation sequence, unnecessary wake-up of multiple UEs located in the cell 701 and 702-707 is avoided and the stages B and C, respectively.

For example, the WUS activation information 791 may be implemented in a parametrized manner by specifying a criterion of a derivation rule that depends on the paging escalation sequence, e.g., in accordance with:

"if current_cell is paged in stage A or stage B, then activate WUS operation else deactivate WUS operation"

FIG. 9 is an example implementation of the WUS activation information 791 and other options are conceivable. For example, the WUS activation information may selectively activate or deactivate the WUS operation depending on a least one of the distance of a given cell to the one or more most-recent active cells, a mobility pattern of the UE, and elapsed time since the trigger event, a WUS capability of the respective cells, or a position of the plurality of cells with respect to end mobility infrastructure. It is possible to take into account multiple such criteria in connection with the WUS activation information. More specifically, in a scenario in which the WUS activation information is implemented by a derivation rule, it would be possible that executing the derivation rule implies that the respective parameter values for one or more such parameterized criteria are input to the respective derivation rule, as explained above with respect to the current cell.

Further, while FIG. 9 illustrates a single most-recent active cell 701, in other scenarios, there may be multiple most-recent active cells. For instance, there may be most-recent active cells of different type, e.g., a first type in which the UE performed the transition 309 from the connected mode 301 to the disconnected mode 302-303, a second type in which the UE provided a measurement report, e.g., on neighboring cells most recently, and/or a third type in which a paging area update request was received from the UE 101. Then, it would be possible that such multiple types of most-recent active cells are taken into consideration when determining, based on the WUS activation information 791, whether the WUS operation is activated or deactivated for a given cell.

Figure 10:
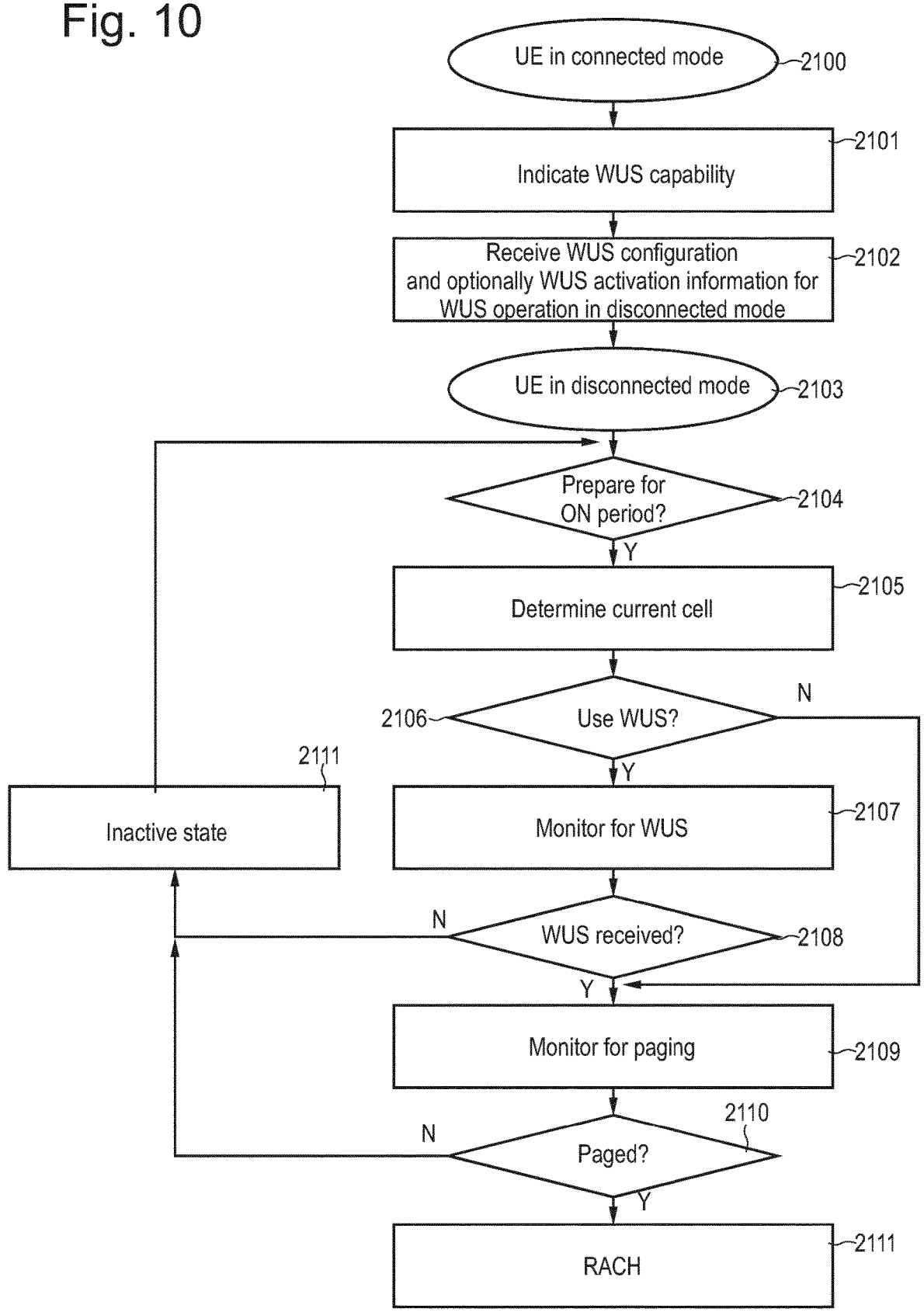
FIG. 10 is a flowchart of a method according to various examples.

FIG. 10 is a flowchart of a method according to various examples. The method of FIG. 10 can be executed by a UE, e.g., by the UE 101. The method of FIG. 10 can be a more specific implementation of the more general method of FIG. 7.

Initially, at box 2100, the UE 101 operates in the connected mode 301.

At box 2101, the UE 101 indicates, to the cellular NW 100, its capability to support WUS operation. More specifically, the UE 101 could indicate that it supports cell-selective and UE-selective activation of the WUS operation.

Then, at box 2102, the UE 101 receives a WUS configuration for the WUS operation during a subsequent disconnected mode 302-303. For example, the WUS configuration can be indicative of time-frequency resources allocated to the transmission of the WUS 980. For instance, the time-frequency resources may be relatively defined, e.g., with respect to the beginning of the PO 396 or with respect to time-frequency resources allocated to the transmission of the paging indicator on the PDCCH. It would be possible that the WUS configuration is indicative of a repetition pattern of the transmission of the WUS 980. The WUS configuration can be indicative of the sequence design of the WUS, e.g., scrambling, interleaving, and/or modulation schemes such as on-off keying, etc.

Optionally, it would be possible that the UE 101 receives, at box 2102, WUS activation information 791. More specifically, the UE 101 can receive data that is indicative of the WUS activation information 791 (cf. TAB. 3). It would be possible that a NW node determines the WUS activation information 791.

Then, at box 2103, the UE 101 performs the transition 309 to the disconnected mode 302-303. The UE 101 can operate its wireless interface 1015 in the inactive state 391.

Then, the UE 101 can prepare for an on period of the DRX cycle 390, aligned with a PO 396. The corresponding check is made at box 2104 and, in the affirmative, the method commences at box 2105. Box 2105, accordingly, corresponds to the time period 1802 of FIG. 3. Here, the UE 101 determines a current cell at box 2105, e.g., based on a synchronization signal 901 such as the PSS.

Then, at box 2106, the UE 101 judges, based on the WUS activation information 791 (that may be received at box 2102 or otherwise obtained, e.g., by loading it from a local memory based on a communications protocol), whether the WUS operation is activated for the current cell. If this is not the case, then the method commences directly at box 2109, i.e., the UE 101 monitors for a paging indicator by blind decoding of PDCCH. Otherwise, the method proceeds to box 2107 and the UE 101 monitors for the WUS 980 at a timing preceding the PO 396. This is in accordance with the WUS configuration information received at box 2102.

At box 2108, the UE 101 judges whether a WUS 980 has been received at box 2107. This can include a correlation of a received symbol sequence with a reference sequence associated with a sequence-based WUS 980.

In case the WUS 980 has been received, the UE proceeds to monitors for the paging indicator at box 2109. Otherwise, the UE 101 re-transitions the wireless interface 1015 to the inactive state 391, at box 2111.

At box 2110, the UE checks whether a paging indicator is received. If this is not the case, the method commences at box 2111.

Otherwise, at box 2112, a RA procedure is executed. This may be conditional on a reception of a paging message on the PDSCH upon receiving the paging indicator including a respective resource allocation for the paging message on the PDSCH (not illustrated in FIG. 10).

Figure 11:
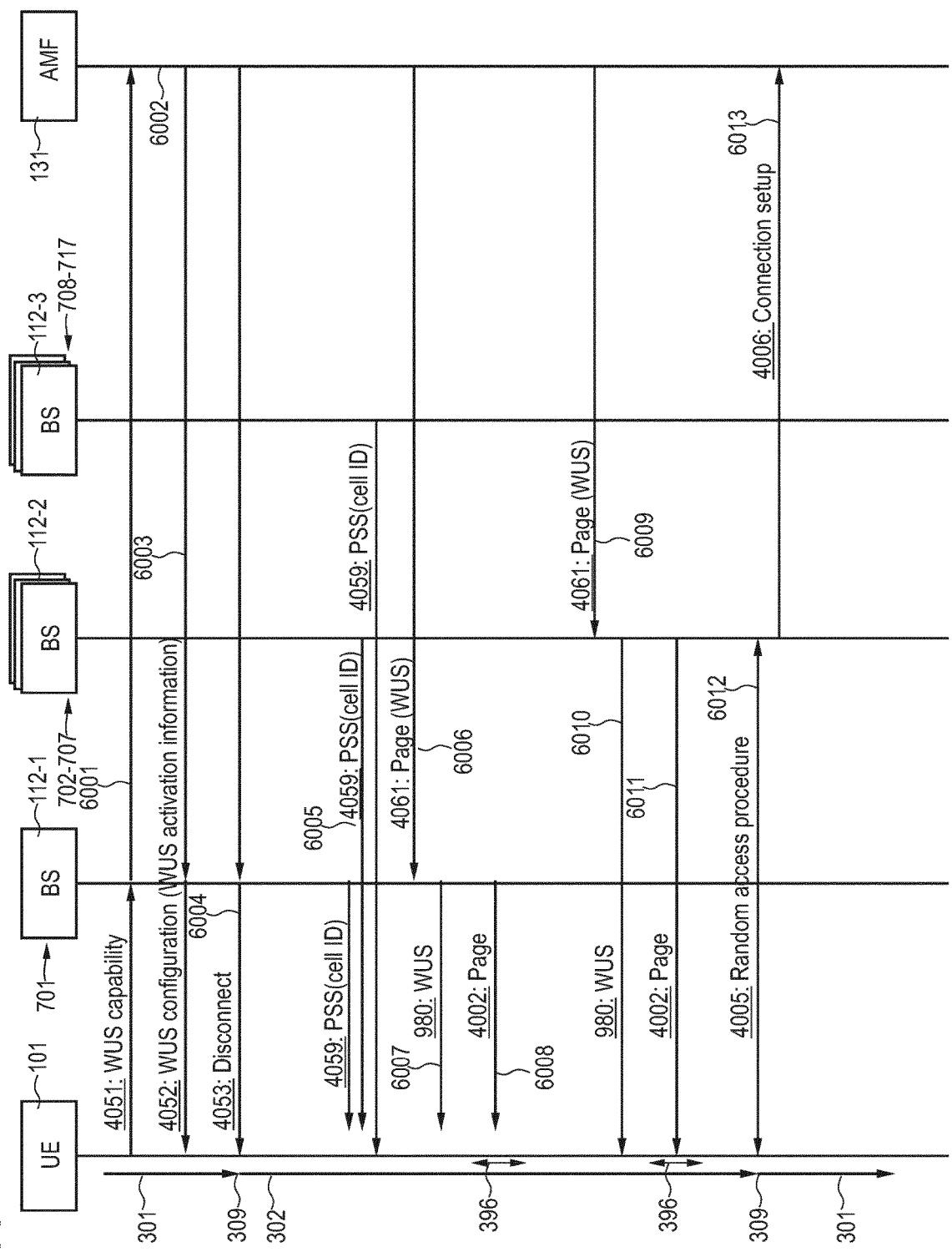
FIG. 11 is a signaling diagram according to various examples.

FIG. 11 is a signaling flowchart of communication between the UE 101, the AMF 131, and BSs 112-1-112-3 of the various cells 701-717 (cf. FIG. 9).

At 6001, the UE 101 operates in the connected mode 301 and is connected through the cell 701. The UE 101 transmits a control message 4051 that is indicative of its capability to support WUS operation. More specifically, the UE 101 could indicate that it supports cell-selective and UE-selective activation of the WUS operation. In the scenario FIG. 11, the control message 4051 is provided to the AMF 131. Accordingly, the control message 4051 could be a NAS control message. 6001 corresponds to box 2101 (cf. FIG. 10).

The AMF 131 can note the respective capability of the UE 101 in the UE context 459 or otherwise log the capability of the UE 101.

At 6003, the AMF 131 provides a WUS configuration as part of a respective control message 4052 to the UE 101. Optionally, the control message 4052 can include data that is indicative of the WUS activation information 791, i.e., provided by the AMF 131 to the UE 101. For this purpose, it would be possible that the AMF 131 determines, at 6002, for each one of the cells 701-717 whether the WUS operation is activated in the respective cell. This can be based, e.g., on the most-recent active cell 701, a paging area 700 to be configured for the UE 101 when in the idle mode 302, the UE mobility, one or more neighbor cell measurements provided by the UE 101, etc., as explained above. Said determining could be based on the traffic load in the various cells, the number of UEs operating in the idle mode 302 in each cell, the number of UEs sharing a WUS in each cell, a position of the respective cell in the paging escalation sequence, and/or a mobility pattern of the UE. This could also be based on predefined WUS activation information 791 loaded from the memory.

Then, at 6004 the BS 112-1 transmits a connection deactivation control message 4053 that releases the data connection 189. This is in response to a core-NW trigger, but other trigger criteria are conceivable.

Accordingly, the UE 101 performs the transition 309 to the idle mode 302 (while the scenario of FIG. 11 illustrates a operation of the UE 101 in the idle mode 302, similar techniques may be readily applicable to operation of the UE 101 in the inactive mode 303).

Then, in preparation of a PO 396, the UE 101 monitors for the PSS 4059 that is indicative of the cell ID of the current cell, at 6005. The BSs 112-1-112-3 all transmit the PSS 4059 encoding the respective cell ID (note that the PSS 4059 is repeatedly transmitted, in particular preceding each PO 396, albeit only indicated once in FIG. 11 for sake of simplicity).

In the scenario FIG. 11, UE mobility has occurred, and the UE 101 is now located in the cell 702. Accordingly, the UE 101 determines that WUS operation is activated, in accordance with the WUS activation information 791 (cf. FIG. 9). Thus, the UE 101 monitors for the WUS (cf. FIG. 10, box 2106-2107).

Initially, the AMF 131, in accordance with the paging escalation sequence (cf. TAB. 4, stage A) triggers the transmission of a WUS 980 and, subsequently, a paging signal 4002 (e.g., a paging indicator communicated on the PDCCH) at the most-recent active cell 701. This includes transmitting a corresponding paging message 4061 at 6006 to the BS 112-1 of the cell 701. The paging message 4061 is indicative of the WUS operation being activated. Then, the BS 112-1 transmits, at 6007, the WUS 980, prior to the respective PO 396 and in accordance with the WUS configuration communicated to the UE 101 at 6003. The BS 112-1 continues to transmit, at 6008, the paging signal 4002. Neither the WUS 980 transmitted at 6007, nor the paging signal 4002 transmitted at 6008 reach the UE 101 (in fact, the UE 101 does not receive the WUS 980 transmitted at 6007 and, thus, does not even monitor for the paging signal 4002; cf. box 2108 and 2111 of FIG. 10), because the UE 101 is out of coverage of the BS 112-1, since it is moved to the cell 702. Thus, the UE 101 cannot be reached at this PO 396.

Thus, the paging escalation sequence commences to the next stage (cf. TAB. 4, stage B). Here, at 6009, the AMF 131 transmits the paging message 4061 to the BSs 112-2 of the cell 702-707, to trigger paging of the UE 101. The paging message 4062 is indicative of the WUS operation being activated, as determined at 6002, i.e., triggers transmission of the WUS 980.

Accordingly, at 6010, the BSs 112-2 transmit the WUS 980 and, at the subsequent PO 396, transmit the paging signal 4002. In the scenario FIG. 11, the UE 101 receives the WUS 980 transmitted at 6010 by the BS 112-2 of the cell 702 and thus commences to monitor for the paging signal 4002 at 6011 (cf. FIG. 10: 2108-2109). The UE 101 receives the paging signal 4002 and, accordingly, at 6012, the RA procedure 4005 commences. For example, a 2-step or 4-step RA procedure may be used.

Then, the transition 309 to the connected mode 301 is implemented. This includes the BS 112-2 of the current cell 702 transmitting a connection setup message 4006 to the AMF 131, at 6013 (once having completed the transition 309 to the connected mode 301—e.g., upon completing the RA procedure—the UE 101 can transmit data along the data connection 189, e.g., on PUSCH). Accordingly, the AMF 131 is aware of the UE 101 having responded to the paging triggered at 6009; then, the paging escalation sequence can be aborted since the paging has completed (cf. TAB. 4; Stage C is not required to be executed).

A different scenario would be observed if the UE mobility occurred so that the UE is located in the cell 708 (instead of in the cell 702). Such a scenario is illustrated in FIG. 12.

Figure 12:
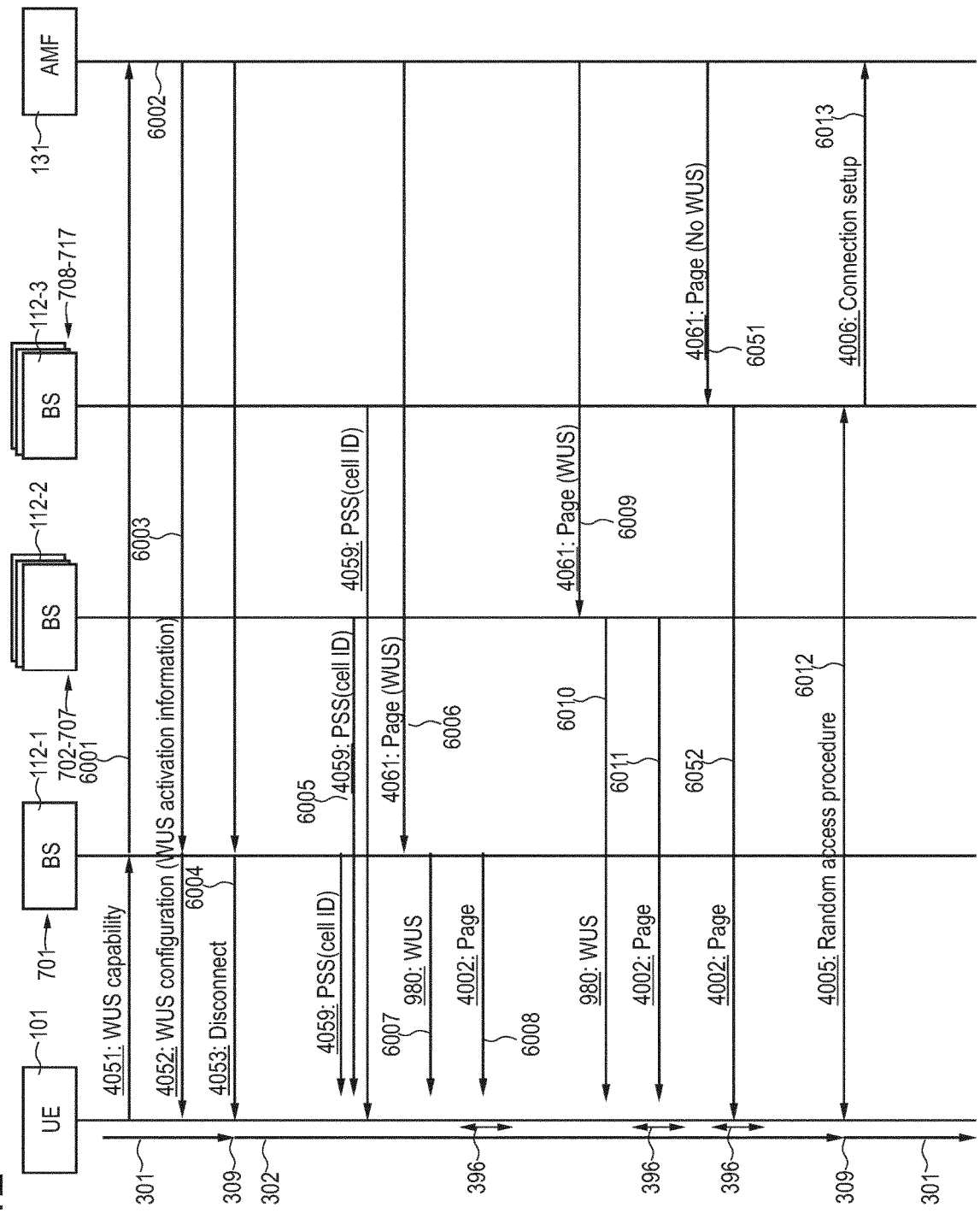
FIG. 12 is a signaling diagram according to various examples.

FIG. 12 is a signaling diagram of communication between the UE 101, the AMF 131, and the BSs 112-1-112-3 of the cells 701-717. The scenario FIG. 12 generally corresponds to the scenario FIG. 11. However, in the scenario FIG. 12, the UE mobility—upon the transition 309 to the idle mode 302—occurs such that the UE 101 is then located in the cell 708.

Accordingly, different from the scenario FIG. 11, the WUS 980 and the paging signal 4002 transmitted by the BSs 112-2 of the cell 702-707 at 6010 and 6011 all fail to reach the UE 101. Accordingly, the AMF 131 proceeds in the paging escalation sequence (cf. TAB. 4, stage C) and transmits a paging message 4061 to the BSs 112-3 of the cells 708-717.

In accordance with the WUS activation information 791 and as determined at 6002, the WUS operation is deactivated for these cells 708-717. Thus, the BSs 112-3 do not transmit a WUS 980, but rather proceed to transmit the paging signal 4002 at 6052 at the respective PO 396. Also, the UE 101 is aware of not being located in the cell 708 (e.g., based on the PSS 4059) and thus, in accordance with the WUS activation information 791, does not expect transmission of the WUS 980 (cf. FIG. 10, box 2106, "N"-branch, box 2109). The UE 101 directly monitors for and receives the paging signal 4002 transmitted by the BS 112-3 of the cell 708 at which the UE 101 is currently located (the UE 101 skips monitoring for the WUS 980) and, accordingly, at 6012, again, the random access procedure 4005 takes place, this time between the UE 101 and the BS 112-3 of the current cell 708.

Examples

Example 1. A method of operating a wireless communication device (101) connectable to a cellular network (100), the method comprising:
obtaining information (791) indicating whether a wake-up signaling operation is activated for the wireless communication device (101) in individual cells (701-720) of the cellular network (100),
determining, based on the obtained information (791) and a current cell of the cellular network (100), whether the wake-up signaling operation is activated for the wireless communication device (101) in the current cell, and
upon determining that the wake-up signaling operation is activated in the current cell: monitoring for a wake-up signal (980) prior to a paging occasion (396) in accordance with the wake-up signaling operation.

Example 2. The method of example 1, wherein the information (791) comprises one or more criteria for activating the wake-up signaling operation for the wireless communication device (101) in the individual cells of the cellular network (100).

Example 3. The method of example 1 or 2,
wherein the information (791) selectively activates the wake-up signaling operation for cells of the cellular network depending on one or more most-recent active cells (701) of the wireless communication device (101).

Example 4. The method of example 3,
wherein the one or more most-recent active cells comprise such cells in which the wireless communication device (101) has communicated within a predetermined time duration or since occurrence of a trigger event.

Example 5. The method of example 3 or 4,
wherein the one or more most-recent active cells comprise such cells in which the wireless communication device (101) has transmitted at least one of a measurement report or a paging area update request message.

Example 6. The method of any one of examples 3 to 5,
wherein the one or more most-recent active cells comprise such cells in which the wireless communication device (101) last operated in a connected mode (301), prior to a transition to a disconnected mode (302-303).

Example 7. The method of any one of the preceding examples,
wherein the information (791) selectively activates the wake-up signaling operation depending on one or more paging areas (700) configured for the wireless communication device (101).

Example 8. The method of any one of the preceding examples,
wherein the information (791) selectively activates the wake-up signaling operation depending on a position of cells of the cellular network in a paging escalation sequence.

Example 9. The method of any one of the preceding examples,
wherein the information (791) selectively activates the wake-up signaling operation depending on at least one of a distance to one or more most-recent active cells, a mobility pattern of the wireless communication device (101), an elapsed time since a trigger event, a wake-up signaling capability of the current cell, or a position of cells of the cellular network with respect to mobility infrastructure.

Example 10. The method of any one of the preceding examples,
wherein the information (791) comprises at least one of a derivation rule comprising one or more parameterized criteria for activating the wake-up signaling operation, a look-up-table, a logical bitmap, an index of a codebook of derivation rules, or a list of cells.

Example 11. The method of any one of the preceding examples,
wherein said obtaining of the information (791) comprises communicating data indicative of the information (791) from the cellular network (100) to the wireless communication device (101).

Example 12. The method of example 11,
wherein the data is at least partly communicated when the wireless communication device (101) operates in a connected mode (301), prior to a transition to a disconnected mode (302-303).

Example 13. The method of example 11 or 12,
wherein the data is at least partly included in a connection control message (4052) associate with a data connection established in a connected mode (301), prior to a transition to a disconnected mode (302-303).

Example 14. The method of example 13,
wherein the connection control message is a connection deactivation message (4053) triggering the transition to the disconnected mode (302-303).

Example 15. The method of any one of examples 11 to 14,
wherein the data is at least partly included in a broadcasted information (791) block or a paging area update message.

Example 16. The method of any one of the preceding examples,
wherein said obtaining comprises loading data indicative of the information (791) from a local memory in accordance with a communications protocol.

Example 17. A method of operating a node (112, 112-1-112-3, 131, 132) of a cellular network (100), the method comprising:
determining, for each of one or more cells (701-717) of the cellular network (100), whether to activate a wake-up signaling operation for a wireless communication device (101) in the respective cell (701-717) prior to paging the wireless communication device (101), and
upon determining that the wake-up signaling operation is to be activated in at least one cell (701-717) of the one or more cells (701-717): triggering a transmission of a wake-up signal (980) prior to a paging occasion (396) in the at least one cell (701-717) in accordance with the wake-up signaling operation.

Example 18. The method of example 17, further comprising:
providing, to the wireless communication device, information (791) indicating whether the wake-up signaling operation is activated for the wireless communication device (101) in individual cells of the cellular network, in accordance with said determining of whether to activate the wake-up signaling operation.

Example 19. The method of example 17 or 18, further comprising:
obtaining information (791) indicative whether to activate the wake-up signaling operation for the wireless communication device in individual cells of the cellular network,
wherein said determining of whether to activate the wake-up signaling operation is based on the information (791).

Example 20. The method of any one of examples 17 to 19,
wherein said determining whether to activate the wake-up signaling operation for the wireless communication device depends on at least one of a traffic load in the cells of the cellular network, a number of wireless communication devices (101) operating in a disconnected mode (302-303), a number of wireless communication devices (101) sharing a wake-up signal, a paging escalation sequence for paging the wireless communication device (101), or a mobility pattern of the wireless communication device (101).

Example 21. A wireless communication device (101) connectable to a cellular network (100) and comprising a control circuitry configured to:
obtain information (791) indicating whether a wake-up signaling operation is activated for the wireless communication device (101) in individual cells (701-720) of the cellular network (100),
determine, based on the obtained information (791) and a current cell of the cellular network (100), whether the wake-up signaling operation is activated for the wireless communication device (101) in the current cell, and
upon determining that the wake-up signaling operation is activated in the current cell: monitor for a wake-up signal (980) prior to a paging occasion (396) in accordance with the wake-up signaling operation.

Example 22. The wireless communication device (101) of example 21, wherein the control circuitry is configured to perform the method of any one of examples 1 to 16.

Example 23. A node (112, 112-1-112-3, 131, 132) of a cellular network (100), the node comprising control circuitry configured to:
determining, for each of one or more cells (701-717) of the cellular network (100), whether to activate a wake-up signaling operation for a wireless communication device (101) in the respective cell (701-717) prior to paging the wireless communication device (101), and
upon determining that the wake-up signaling operation is to be activated in at least one cell (701-717) of the one or more cells (701-717): triggering a transmission of a wake-up signal (980) prior to a paging occasion (396) in the at least one cell (701-717) in accordance with the wake-up signaling operation.

Example 24. The node of example 22, wherein the control circuitry is configured to perform the method of any one of examples 17 to 20.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various scenarios have been discussed in which the WUS activation information is obtained by the UE by receiving a respective signalling from the cellular NW. Such signalling can then indicate for multiple cells whether the WUS operation is activated in each respective cell. However, scenarios would be conceivable in which each individual cell of the cellular NW broadcasts the WUS activation information whether the WUS operation is activated in the respective cell. Accordingly, it is not required (but possible) that the WUS activation information includes information for multiple cells, e.g. neighbour cells or cells within a paging area: scenarios are conceivable where each cell provides the WUS activation information only for this local cell.

The invention claimed is:
1. A method of operating a wireless communication device connectable to a cellular network, the method comprising:
obtaining information indicating whether a wake-up signaling operation is activated for the wireless communication device in individual cells of the cellular network depending on a position of the cells of the cellular network in a paging escalation sequence, wherein the paging escalation sequence includes progressively increasing a paging radius around one or more most recently active cells, the paging escalation sequence includes a first stage in which the wake-up signaling operation is activated for the wireless communication device only in the one or more most recently active cells, and a second stage in which the wake-up signaling operation is only activated for the wireless com- munication device in one or more neighboring cells that surround the one or more most recently active cells, determining, based on the obtained information and a current cell of the cellular network and a detected direction of movement for the wireless communication device, whether the wake-up signaling operation is activated for the wireless communication device in the current cell, and upon determining that the wake-up signaling operation is activated in the current cell: monitoring for a wake-up signal prior to a paging occasion in accordance with the wake-up signaling operation.

2. The method of claim 1, wherein the information indicates whether a wake-up signaling operation is activated for the wireless communication device in the individual cells depending on a position of the individual cells of the cellular network in a paging escalation sequence.

3. The method of claim 1, wherein the information is indicative of a selective activation of the wake-up signaling operation depending on one or more paging areas configured for the wireless communication device.

4. The method of claim 1, wherein the information is indicative of a selective activation of the wake-up signaling operation depending on at least one of a distance to one or more most-recent active cells, a mobility pattern of the wireless communication device, an elapsed time since a trigger event, a wake-up signaling capability of the current cell, or a position of cells of the cellular network with respect to mobility infrastructure.

5. The method of claim 1, wherein the information comprises at least one of a derivation rule comprising one or more parameterized criteria for activating the wake-up signaling operation, a look-up-table, a logical bitmap, an index of a codebook of derivation rules, or a list of cells.

6. The method of claim 1, wherein said obtaining of the information comprises communicating data indicative of the information from the cellular network to the wireless communication device.

7. The method of claim 6, wherein the data is at least partly communicated when the wireless communication device operates in a connected mode, prior to a transition to a disconnected mode.

8. The method of claim 6, wherein the data is at least partly included in a connection control message associate with a data connection established in a connected mode, prior to a transition to a disconnected mode.

9. The method of claim 8, wherein the connection control message is a connection deactivation message triggering the transition to the disconnected mode.

10. The method of claim 6, wherein the data is at least partly included in a broadcasted information block or a paging area update message.

11. The method of claim 1, wherein the paging escalation sequence includes a first stage in which the wake-up signaling operation is only activated for the wireless communication device in the one or more most recently active cells, and a second stage in which the wake-up signaling operation is only activated for the wireless communication device in the one or more most recently active cells and in one or more neighboring cells that surround the one or more most recently active cells.

12. A method of operating a node of a cellular network, the method comprising:

determining, for each of one or more cells of the cellular network, whether to activate a wake-up signaling operation for a wireless communication device in a respective cell of the one or more cells prior to paging the wireless communication device, wherein said determining depends on a detected direction of movement for the wireless communication device and a paging escalation sequence for paging the wireless communication device, the paging escalation sequence includes a first stage in which the wake-up signaling operation is activated for the wireless communication device only in one or more most recently active cells, and a second stage in which the wake-up signaling operation is only activated for the wireless communication device in one or more neighboring cells that surround the one or more most recently active cells, and upon determining that the wake-up signaling operation is to be activated in at least one cell of the one or more cells: triggering a transmission of a wake-up signal prior to a paging occasion in the one or more cells in accordance with the wake-up signaling operation.

13. The method of claim 12, further comprising:

providing, to the wireless communication device, information indicating whether the wake-up signaling operation is activated for the wireless communication device in individual cells of the cellular network, in accordance with said determining of whether to activate the wake-up signaling operation.

14. The method of claim 13, further comprising:

obtaining information indicative whether to activate the wake-up signaling operation for the wireless communication device in individual cells of the cellular network, wherein said determining of whether to activate the wake-up signaling operation is based on the information.

15. The method of claim 12, wherein said determining whether to activate the wake-up signaling operation for the wireless communication device depends on a traffic load in the cells of the cellular network.

16. The method of claim 12, wherein said determining whether to activate the wake-up signaling operation for the wireless communication device depends on a number of wireless communication devices operating in a disconnected mode or a number of wireless communication devices sharing a wake-up signal.

17. The method of claim 12, wherein the paging escalation sequence includes progressively increasing a paging radius around one or more most recently active cells.

18. A wireless communication device connectable to a cellular network and comprising a control circuitry configured to:

obtain information indicating whether a wake-up signaling operation is activated for the wireless communication device in individual cells of the cellular network, wherein the wake-up signaling operation is activated according to a paging escalation sequence that includes includes a first stage in which the wake-up signaling operation is activated for the wireless communication device only in one or more most recently active cells, and a second stage in which the wake-up signaling operation is only activated for the wireless communication device in one or more neighboring cells that surround the one or more most recently active cells, determine, based on the obtained information and a current cell of the cellular network and a detected direction of movement for the wireless communication device, whether the wake-up signaling operation is activated for the wireless communication device in the current cell, and upon determining that the wake-up signaling operation is activated in the current cell: monitor for a wake-up signal prior to a paging occasion in accordance with the wake-up signaling operation.

19. The wireless communication device of claim 18, wherein the paging escalation sequence includes progressively increasing a paging radius around one or more most recently active cells.

20. The wireless communication device of claim 18, wherein said determining whether to activate the wake-up signaling operation for the wireless communication device depends on a number of wireless communication devices operating in a disconnected mode or a number of wireless communication devices sharing a wake-up signal.

* * * * *